United States Patent
Reinecke et al.

(10) Patent No.: US 6,801,373 B2
(45) Date of Patent: Oct. 5, 2004

(54) PROJECTION LENS

(75) Inventors: Wolfgang Reinecke, Zeuthen (DE); Horst Linge, Kaufungen (DE)

(73) Assignees: Dr.-Ing. Wolfgang Reinecke Ingenieurburo fur Optik-Entwicklung (DE); Optische Systeme Gottingen ISCO-Optic GmbH (DE)

(*) Notice: Subject to any disclaimer, the term of this patent is extended or adjusted under 35 U.S.C. 154(b) by 0 days.

(21) Appl. No.: 10/451,045

(22) PCT Filed: Dec. 12, 2001

(86) PCT No.: PCT/EP01/14627
§ 371 (c)(1), (2), (4) Date: Jan. 5, 2004

(87) PCT Pub. No.: WO02/50595
PCT Pub. Date: Jun. 27, 2002

(65) Prior Publication Data
US 2004/0105172 A1 Jun. 3, 2004

(30) Foreign Application Priority Data
Dec. 18, 2000 (EP) .............................. 00127683

(51) Int. Cl.[7] .............................. G02B 9/00; G02B 9/62; G02B 3/00; G02B 15/14
(52) U.S. Cl. ...................... 359/754; 359/761; 359/762; 359/649; 359/680; 359/682
(58) Field of Search ................. 359/754, 649, 359/648, 650, 663, 761, 762, 680, 682

(56) References Cited

U.S. PATENT DOCUMENTS

| | | | |
|---|---|---|---|
| 3,938,883 A | 2/1976 | Takahashi | 359/750 |
| 4,025,169 A | 5/1977 | Fischer et al. | 359/749 |
| 4,070,098 A | 1/1978 | Buchroeder | 359/725 |
| 4,566,764 A | 1/1986 | Matsuo | 359/750 |
| 5,973,848 A | 10/1999 | Taguchi et al. | 359/651 |
| 6,160,671 A | 12/2000 | Nakazawa | 359/749 |

FOREIGN PATENT DOCUMENTS

| | | |
|---|---|---|
| DE | 4212067 | 10/1993 |
| DE | 1134606 | 1/2000 |
| EP | 0548529 | 11/1992 |

*Primary Examiner*—Tim Thompson
(74) *Attorney, Agent, or Firm*—Price, Heneveld, Cooper, DeWitt & Litton, LLP

(57) ABSTRACT

A lens assembly comprising nine lenses. Each lens includes u greater than or equal to about 12.8°, LEP equal to or from about 100 mm to about 400 mm, α Rba greater than or equal to about 1°, and α Rbi less than or equal to about −14°. The outward ray angle tilt and the inward ray angle tilt are positive if the outward ray and the inward ray intersect the optical axis at a location which, when seen from the object, is in an opposite direction to projection. The outward ray angle tilt and the inward ray angle tilt are negative if the outward ray and the inward ray intersect the optical axis at a location which, when seen from the object, is in the direction of projection.

6 Claims, 15 Drawing Sheets

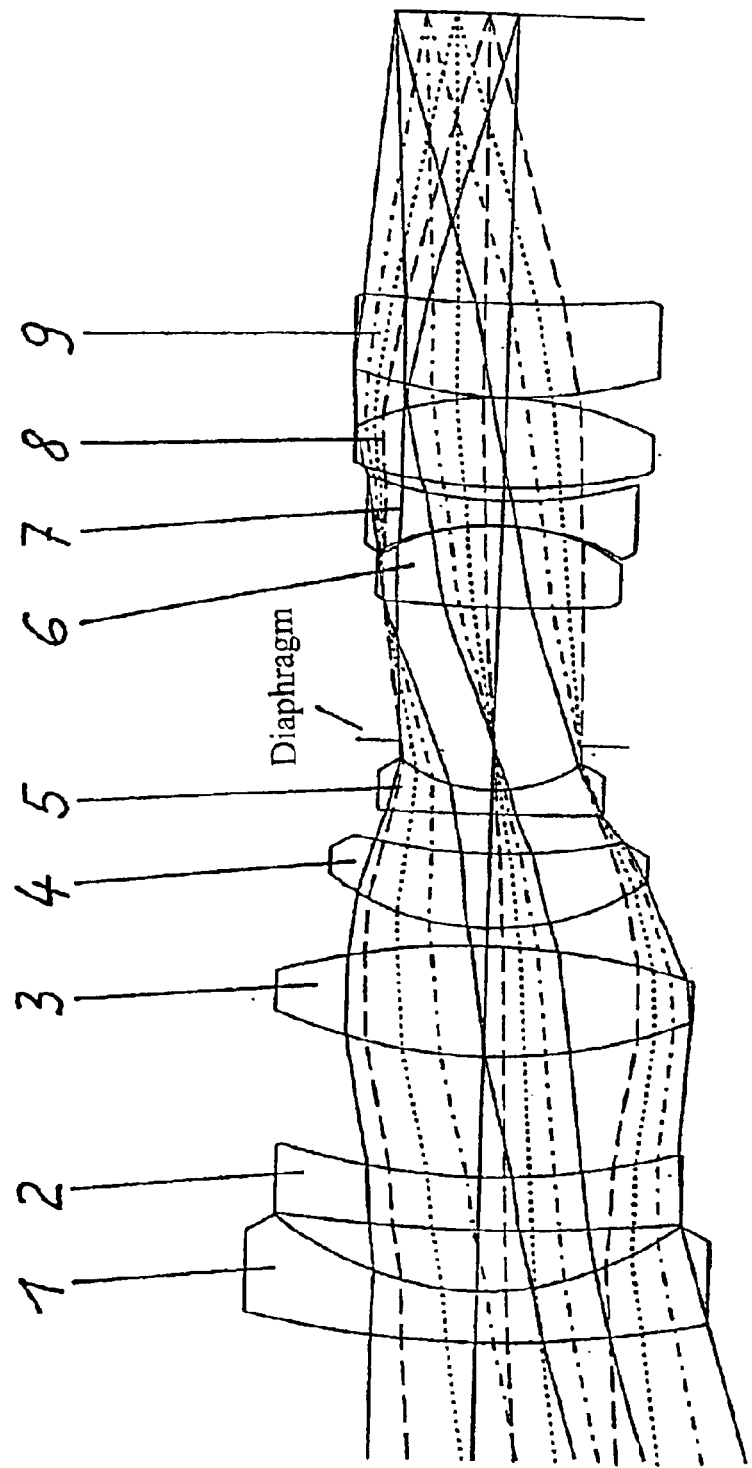

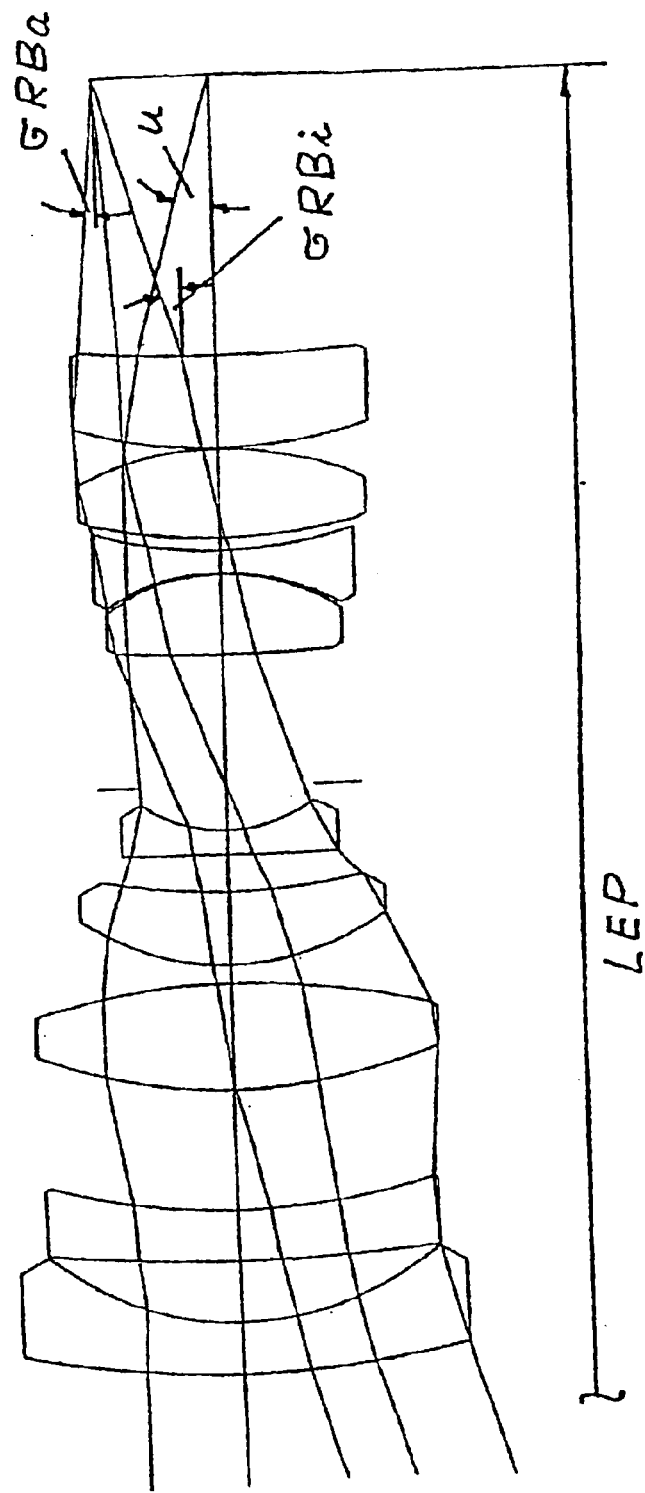

FIG. 1.2
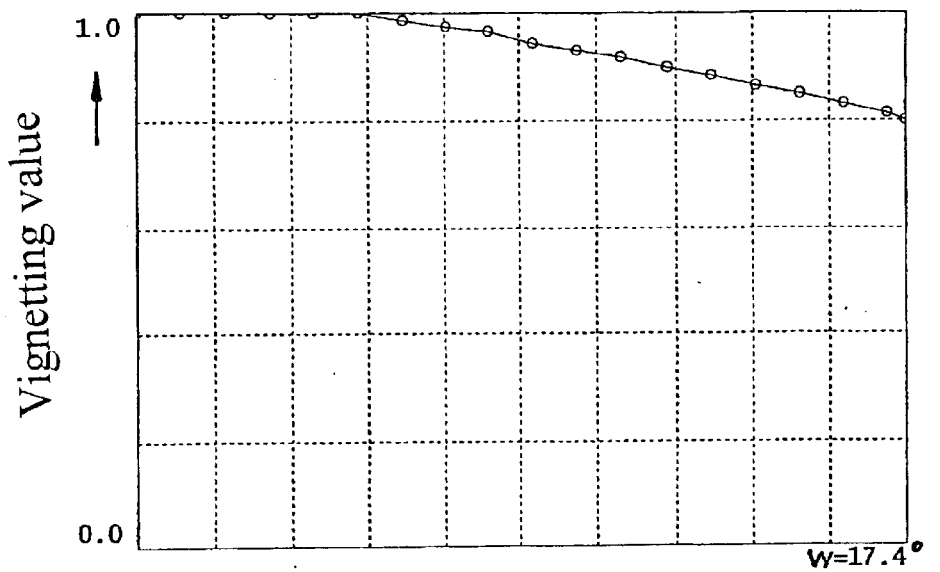
Back Focus = 32.69502 mm
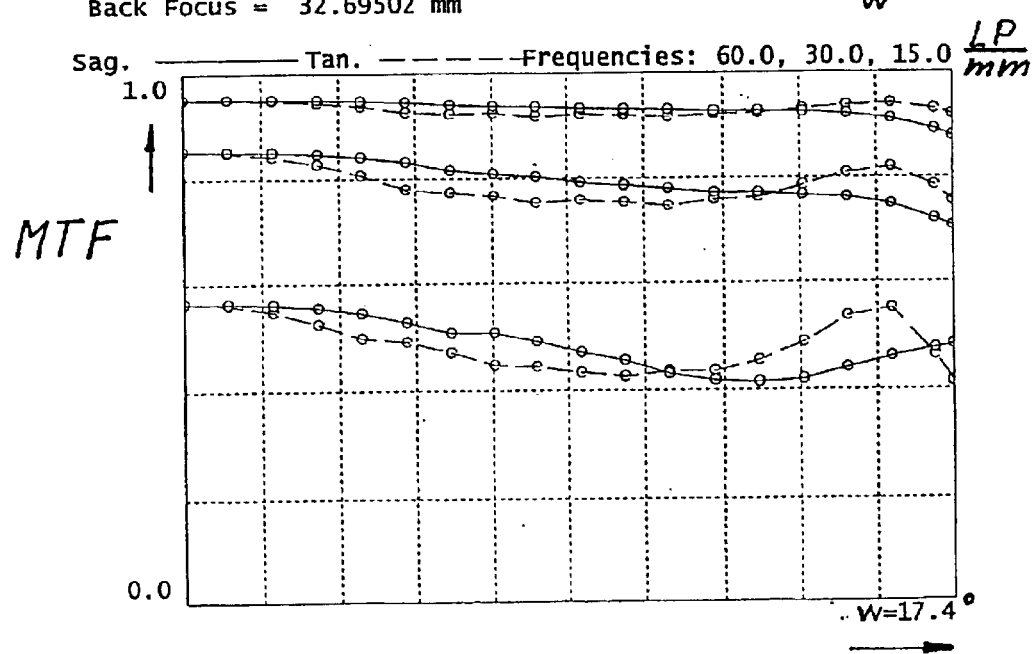
FIG. 1.3

FIG. 1.4
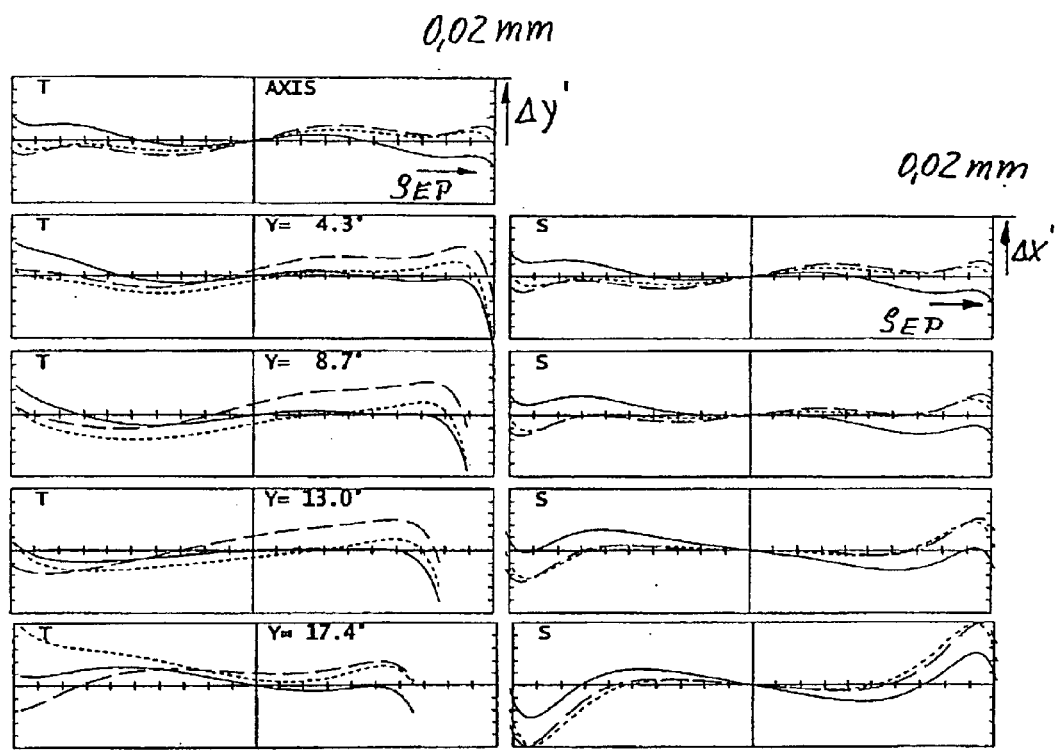
Wavelengths [nm]:
———————  — — — —  - - - - - - -
587.60         656.30         486.10

FIG. 1.5
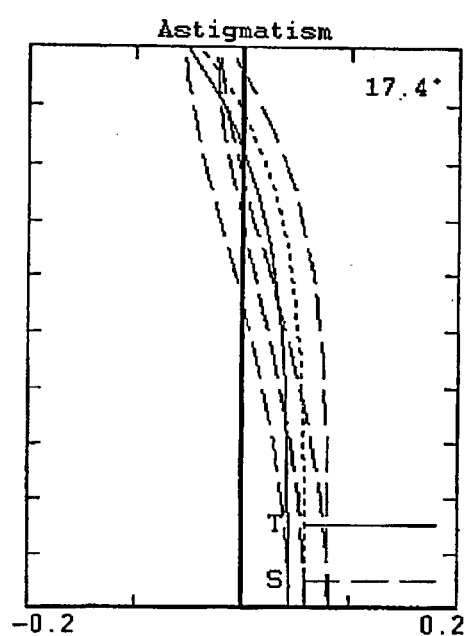
FIG. 1.6
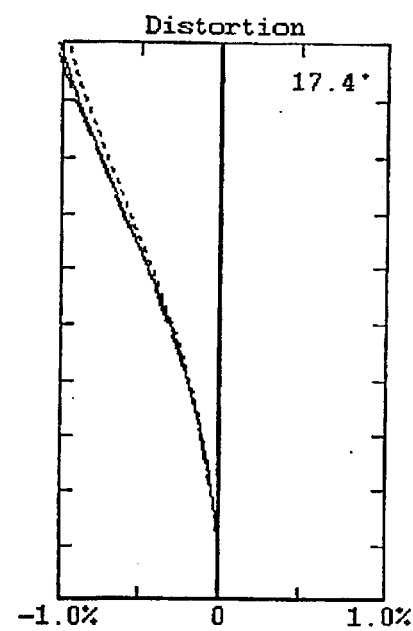
Wavelengths [nm]:
———————— 587.60   — — — 656.30   ·········· 486.10

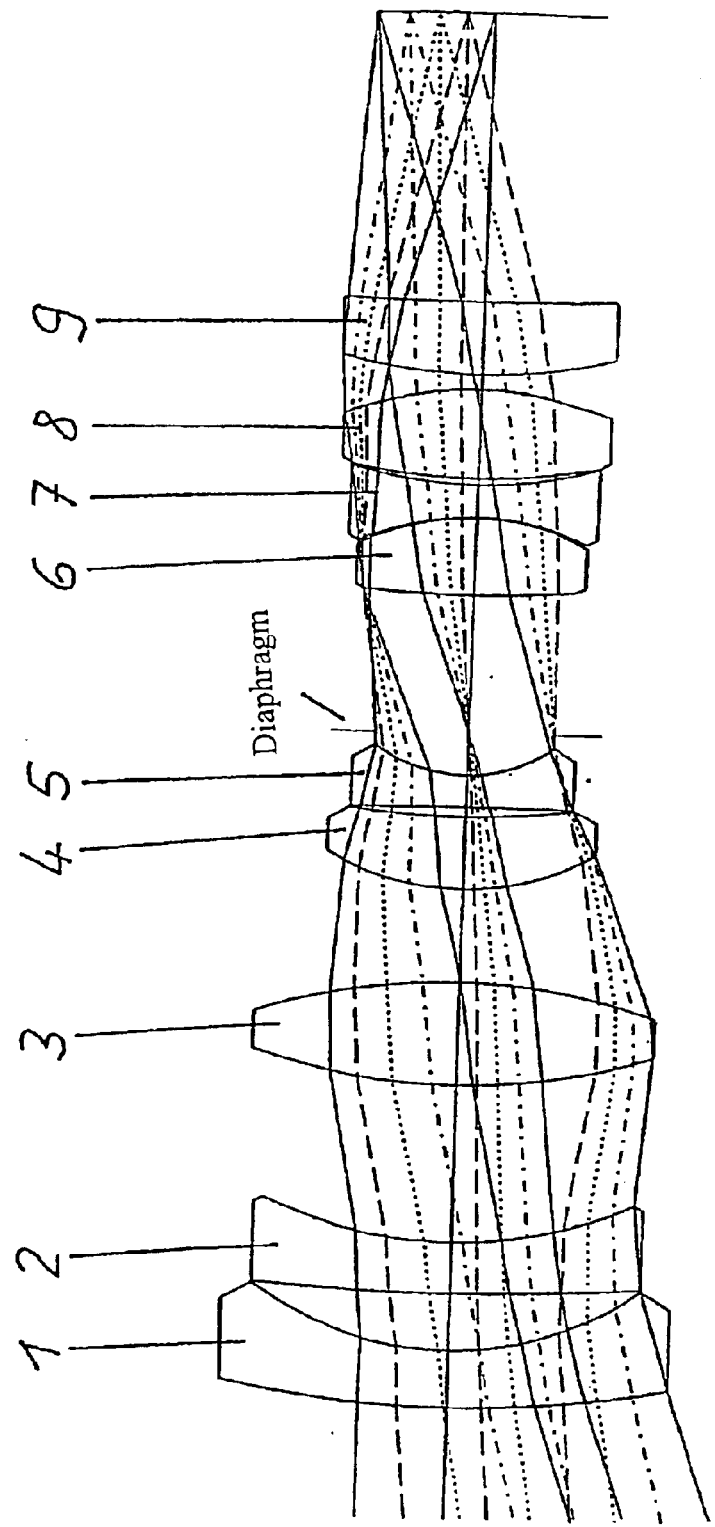
FIG. 2.1a

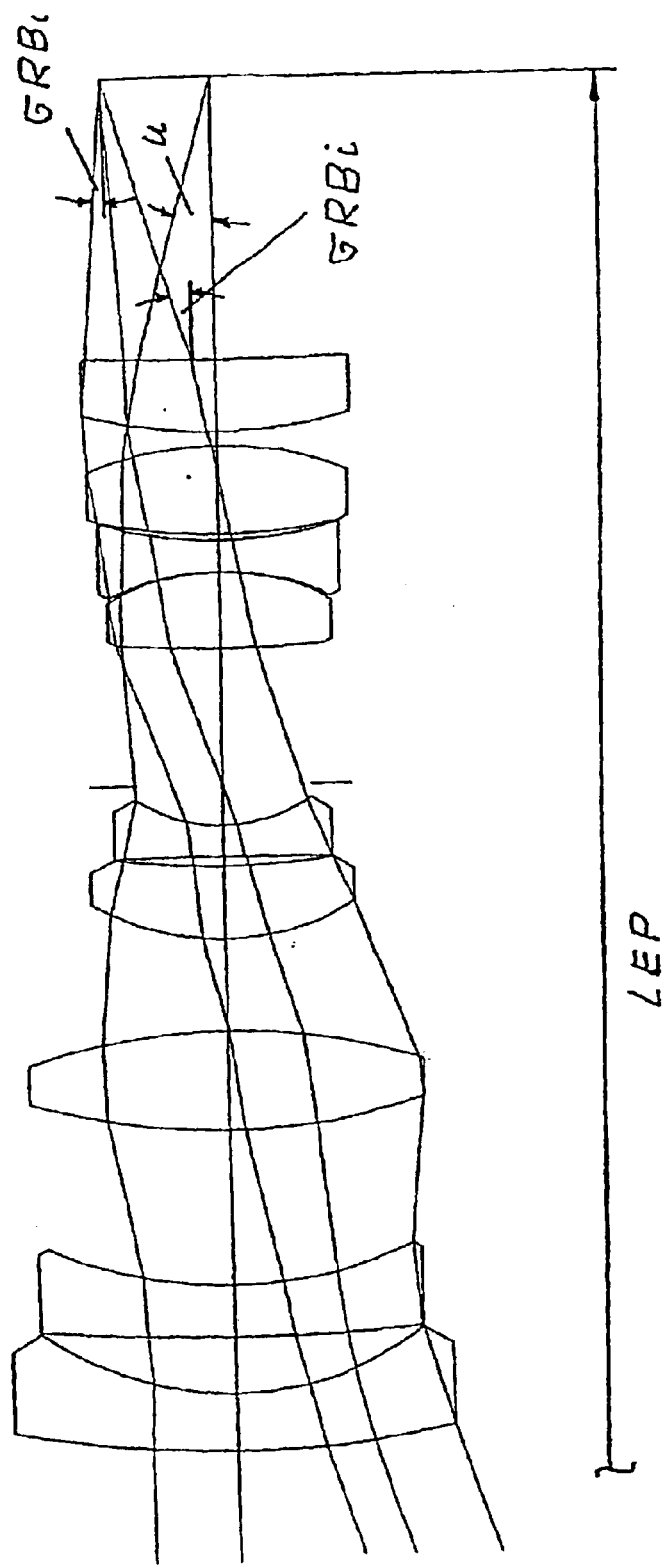

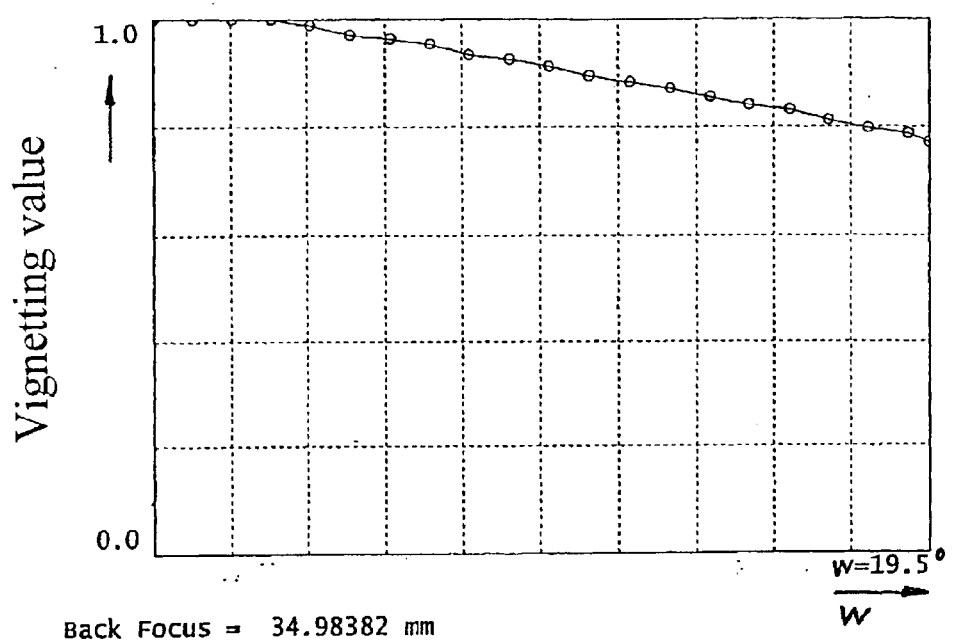
FIG. 2.2
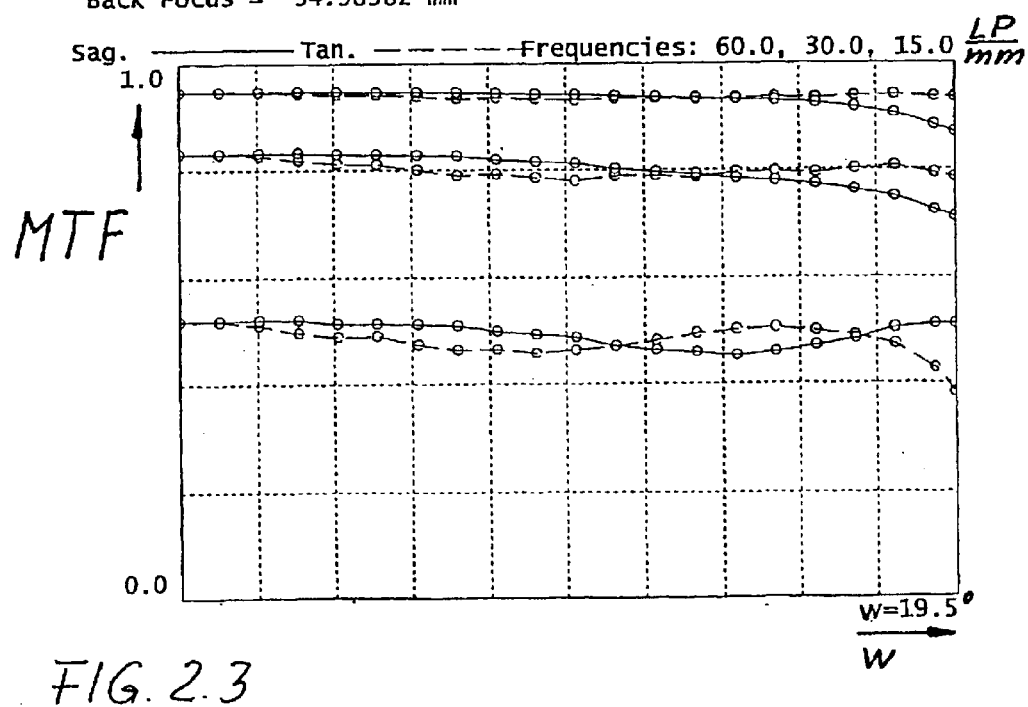
FIG. 2.3

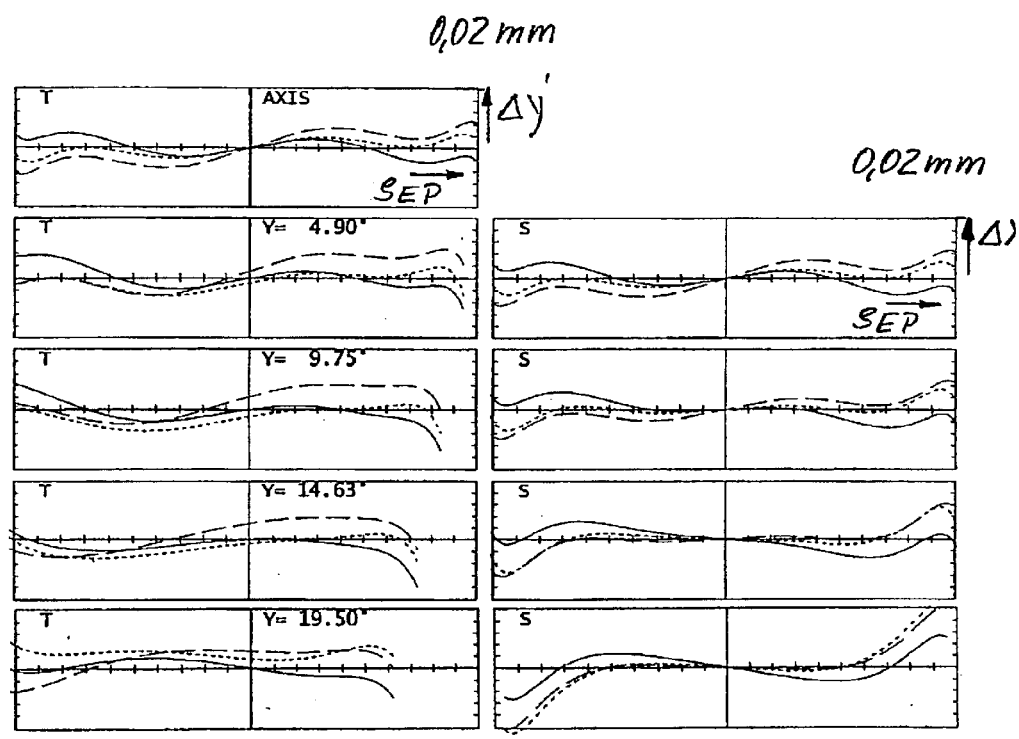
FIG. 2.4
Wavelengths [nm]:
587.60    656.30    486.10

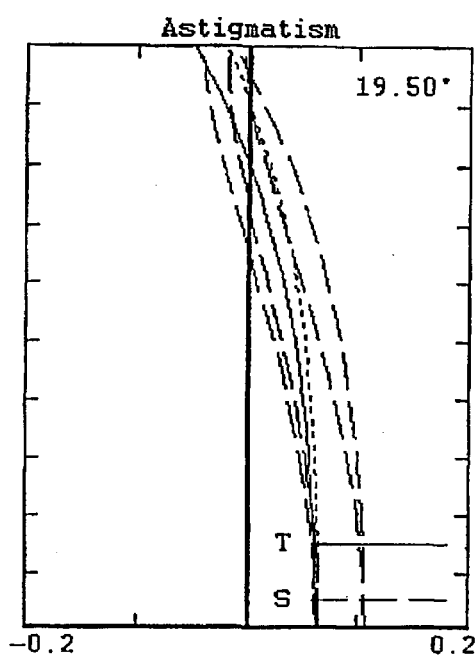
FIG. 2.5
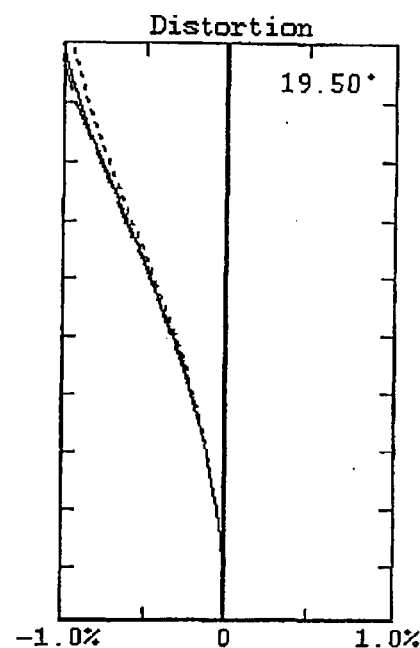
FIG. 2.6
Wavelengths[nm]:
———————  — — — —  ············
587.60          656.30         486.10

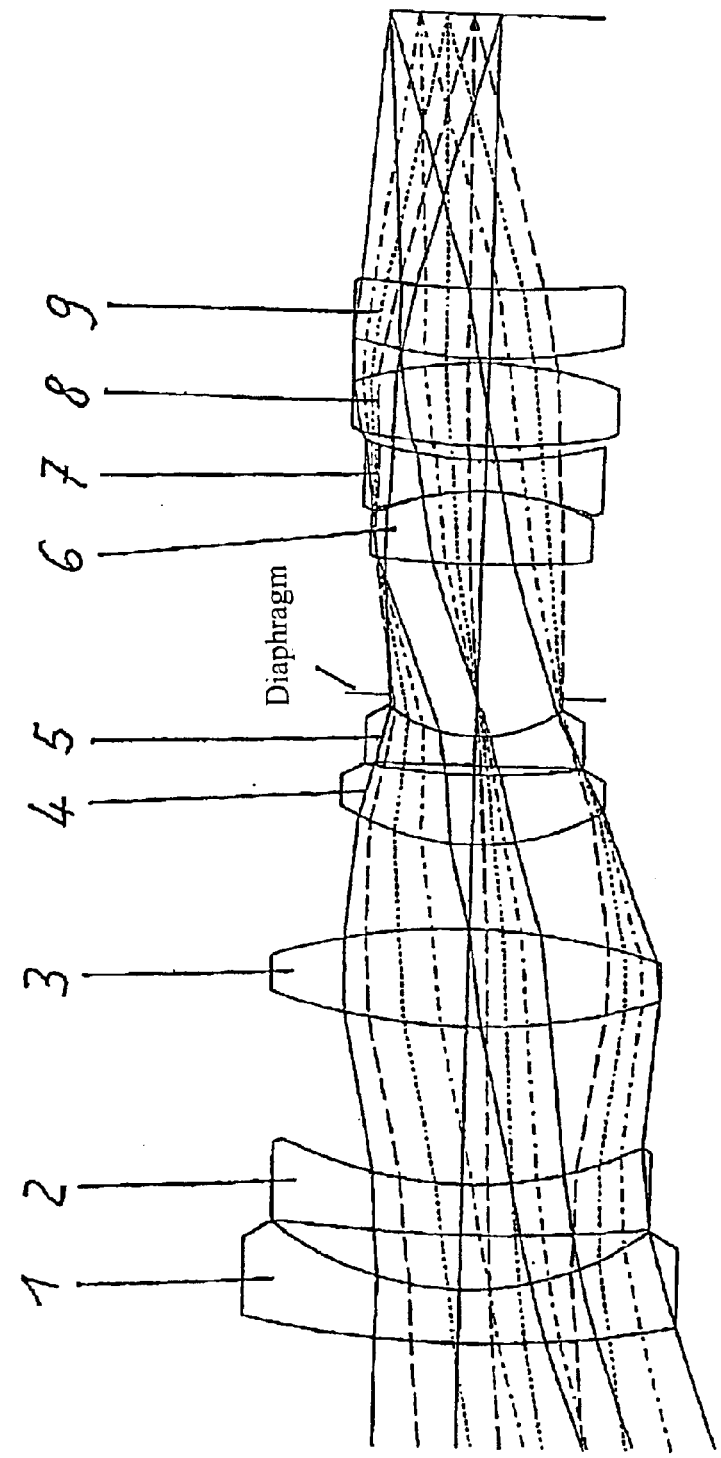
FIG. 3.1a

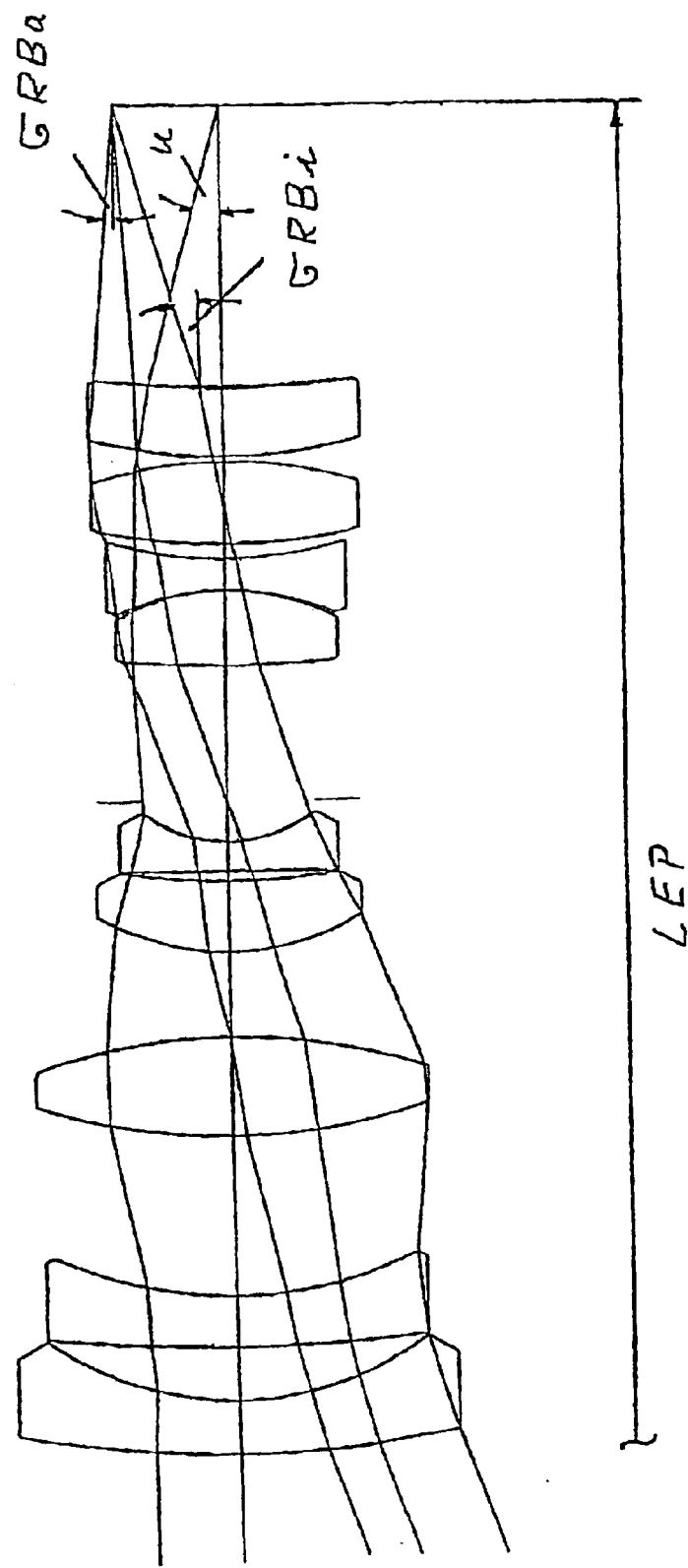
FIG. 3.16

FIG. 3.2
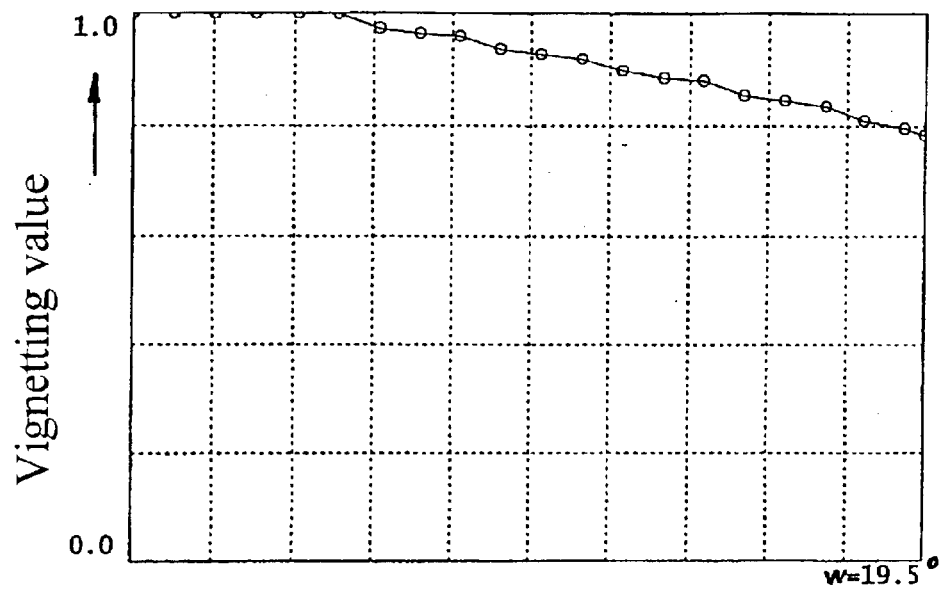
Back Focus = 34.91591 mm
Sag. ——— Tan. ----- Frequencies: 60.0, 30.0, 15.0 $\frac{LP}{mm}$
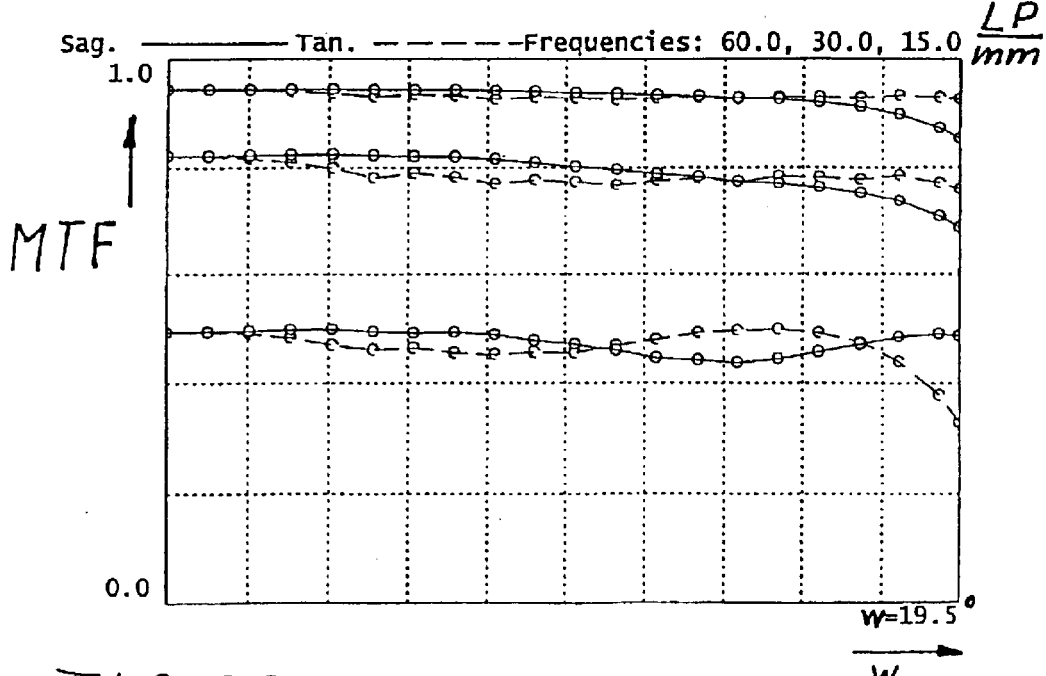
FIG. 3.3

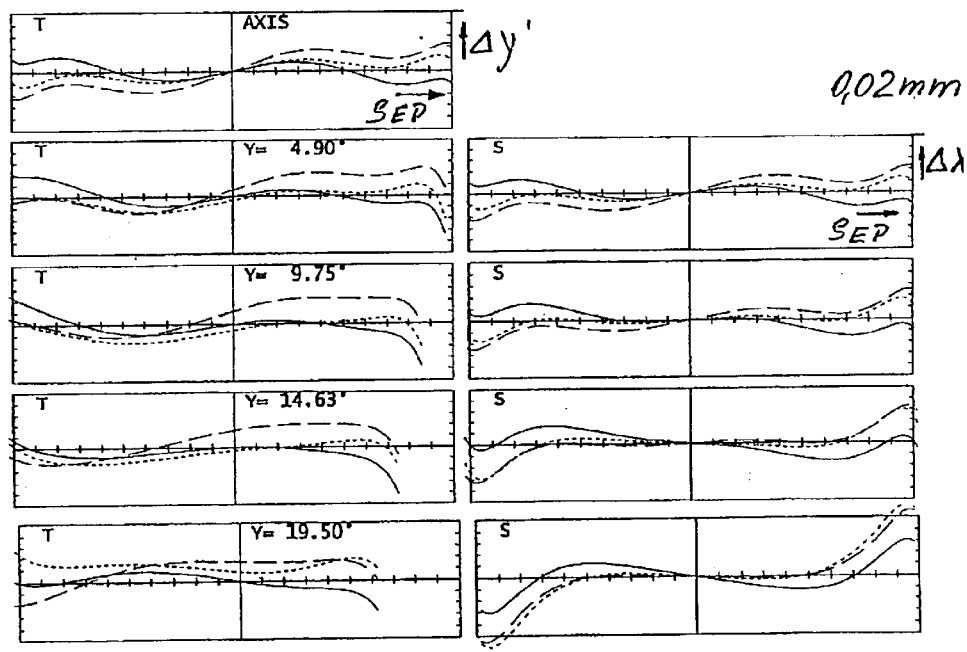
FIG. 3.4
Wavelengths [nm]:
587.60   656.30   486.10

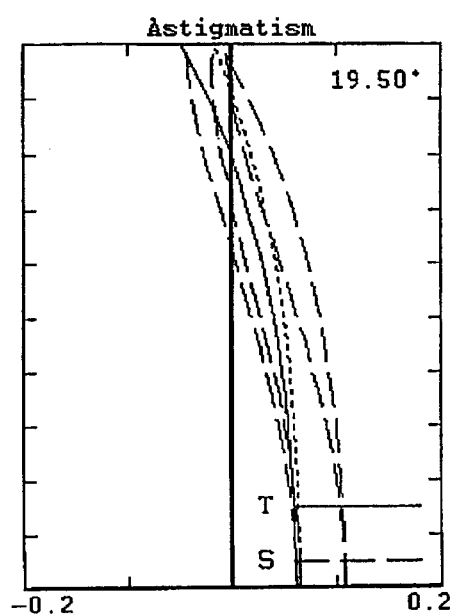
FIG. 3.5
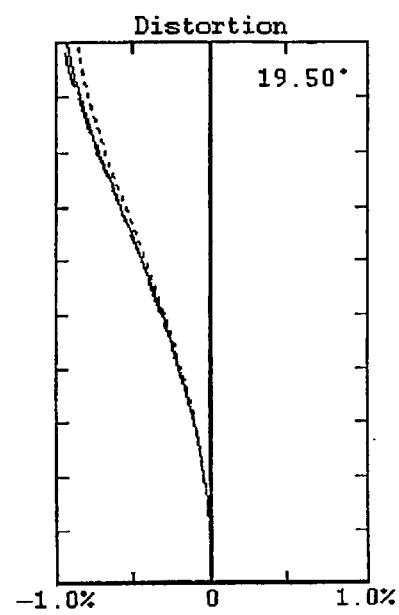
FIG. 3.6
Wavelengths[nm]:
———————  — — — — —  ‑‑‑‑‑‑‑‑‑‑‑‑
587.60         656.30         486.10

PROJECTION LENS

CROSS-REFERENCE TO RELATED APPLICATIONS

This application is the National Phase of International Application No. PCT/EP01/14627, filed in Germany on Dec. 12, 2001 designating the United States of America, which claims priority to E.P. Patent Application No. 00 127 683.1, filed on Dec. 12, 2000.

FIELD OF THE INVENTION

The invention's primary application is with theater projection and the like, specifically with 35 mm film.

BACKGROUND OF THE INVENTION

The invention relates to a luminous projection lens.

A luminous projection lens equipped with 7 lenses is described in applicants' published European patent application 00 100 890.3. This 7 lens system is not particularly suited for systems which require shorter focal lengths and/or larger image fields. Additional problems associated with such 7 lens systems include keeping a certain minimum back focal length and minimum overall length depending on the image angle, which may not be exceeded due to installation provisions or application constraints.

Those types of lens systems which meet the above noted requirements more appropriately, are similar to those of typical wide angle lenses with inverse configurations. Such lens systems have been known for a long time and were described in many patent documents. However, such prior lens systems, have a diaphragm position adapted to certain predetermined correction requirements, and must therefore submit to or be used with these requirements. The provisions of bundle geometry according to the present invention are not met by any of these prior lens systems.

More specifically, these types of prior lens systems can be categorized and summarized as follows:

Each of the 7-lens systems disclosed in U.S. Pat. Nos. 4,537,476; 4,468,100; 4,176,914; 3,874,770, and DE-OS 2551583, DE-AS 1472135 contain the basic system configuration necessary to obtain good projection quality with a large aperture and large fields in a retrofocus style. However, the projection quality that can be achieved is insufficient for the target values needed in these cases (a contrast of 60 LP/mm>40% throughout an entire image field, distortion $\leq 1\%$). The same also applies to the 8-lens and 9-lens systems of patents DE-AS 2443319, DE-OS 2321864; U.S. Pat. Nos. 4,566,764, 3,736,049, which also contain doublets that are precluded with the application purpose at hand.

Patents DE-OS 2554963, DE-OS 2306346, DE-PS 2512797, DE-PS 2514081, DE-PS 2436444, DE-OS 2359156, DE-PS 2344224, DE-OS 2254586 describe modified lens systems of the aforementioned basic types with lenses numbered from 7 to 12 lenses, and preference is also given to an aspheric surface design.

This is similar with systems in patent documents U.S. Pat. Nos. 5,724,195, 5,684,643, 5,625,497 and 5,477,389, in which aspheric surfaces, lenses numbered from 7 to 9 and extremely short focal lengths are preferred. The patent claims formulated in this document are essentially kept much more general, as the claims first of all differentiate only between an anterior and posterior assembly with a diaphragm positioned in between, and consequently a certain number of requirements are devised. These requirements, however, apply only in their entirety, as individual requirements are partially the basis for claims in the aforementioned and other patent documents (such as e.g. DE-PS 2514081, same as U.S. Pat. No. 4,025,169). Some of these requirements are also met entirely or partly by a system configuration according to the invention. Albeit, the requirements of bundle geometry according to the present invention are completely unaffected by this.

In summary, the following can be stated: The lens systems disclosed in the aforementioned documents meet neither the requirements of bundle geometry according to the present invention, nor the quality requirements for the projection performance necessary throughout an entire image field giving consideration to the number of lenses.

Furthermore, these prior lens systems were partly designed giving preference to aspheric surfaces as well as doublets. Neither are required in the lens system configuration of the present invention.

SUMMARY OF THE INVENTION

The purpose of the invention is to provide lens, and in particular a series of lenses, which on one hand meet the most effective use of light distribution across an entire object field, and on the other hand have a projection quality greater or the same as the projection quality of known technical solutions when using technologically favorable glasses.

One aspect of the invention relates to a projection lens that is composed of nine lenses with bilateral air-glass surfaces. The aim of the invention is to provide a lens or a series of lenses that guarantee the most effective light distribution across the entire object field while offering a projection quality that is greater than or equal to the projection quality of the known technical solutions while creating technologically favorable glasses. To this end, the projection lens according to the invention meets the following requirements in their entirety: $u \geq 12.8°$, 100 mm $\leq LEP \leq 400$ mm, $\alpha\, RBa \geq 1°$, $\alpha\, RBi \leq -14°$, with u being the orifice angle (2 u total angle) at the illumination side, LEP being the distance of the entrance pupil (illumination side) from the object plane (position in the direction of projection from the reference point of the object plane is a positive value), $\alpha\, RBa$ being the angular tilt of the beam with respect to the optical axis in the object space between the object and the first lens surface of the lens that delimits the bundle for the field edge (outer field point in the object) towards the exterior (away from the optical axis, axis-remote), and $\alpha\, RBi$ being the angular tilt of the beam with respect to the optical axis in the object space between the object and the first lens surface of the lens that delimits the bundle for the field edge (outer field point in the object) towards the interior (towards the optical axis, axis-close). The angles $\alpha\, RBa$ and $\alpha\, Rbi$ are positive if the corresponding beams intersect the optical axis in a point that lies in the opposite direction of projection when seen from the object, and they are negative if they intersect the optical axis in a point that lies in the direction of projection when seen from the object. The lenses are positioned in the following sequence, starting from the image (blow-up side) towards the object (reduction and illumination side): a fist negative, meniscus-shaped lens (1), with the convex surface on the image side, a second negative, meniscus-shaped lens (2), with the convex surface on the image side, a third positive lens (3), with a convex surface on the object side, a fourth positive, meniscus-shaped lens (4), with a convex surface on the image side, a fifth negative lens (5), with a concave surface on the object side, a sixth biconvex lens (6), a seventh biconcave lens (7), an eighth positive lens (8), with a convex surface on the object side, and a ninth positive lens (9), with a convex surface on the image side.

According to the invention, this task is solved with lenses according to the characteristics of claims 1 to 5. In comparison to the aforementioned systems (see "Background of the Invention"), a lens according to the invention distinguishes itself in that it maintains all effectivity parameters to adjust to condenser systems and that it affords an improvement in projection quality.

According to claim 1, a lens according to the invention meets the stated requirements, ensuring effective adjustment to condenser systems. The fundamental nature of this part of the invention is described in detail in European patent application 00 100 890.3, which is why it is not further detailed in this document.

The calculation of lenses with shorter focal lengths, while maintaining the same object format and thus larger image angles, has become more and more difficult with respect to the system configuration described in European patent application 00 100 890.3, as astigmatism and image field curvature of the image field's outer part can no longer be sufficiently corrected. The astigmatic difference and image field curvature have unacceptable values in a range of ¾ of the image field. The same applies to color aberrations and distortion. Therefore these systems' excellent corrective condition can no longer be maintained throughout an entire image field. In addition, it is increasingly impossible to meet the requirements necessary for these systems' installation provisions. This is specifically the case when maintaining a certain minimum value for the last back focal length and a certain minimum overall length, which rises with an increasing image angle. For these reasons, the prevailing basic type of projection had to be further developed after the European patent application and adapted to new conditions.

This development resulted in typical wide angle lenses with an inverse configuration. Such system types have been abundantly described in the aforementioned patents (see "Background of the Invention") However, none of them meet the requirements of bundle geometry according to claim 1. The distance between entrance pupil and object plane is preferably always <100 mm, and therefore angle α RBa is largely negative. In addition, the projection quality of systems in the aforementioned patents (see "Background of the Invention") with up to 9 lenses and in part more, is not sufficient for required target values (a contrast of 60 LP/mm>40% throughout an entire image field, distortion ≦1%). This can mostly be attributed to insufficient correction of astigmatism and image field curvature.

Patents DE-OS 2554963, DE-OS 2306346, DE-PS 2512797, DE-PS 2514081, DE-PS 2436444, DE-OS 2359156, DE-PS 2344224, DE-OS 2254586 as well as patent documents U.S. Pat. Nos. 5,724,195, 5,684,643, 5,625,497 and 5,477,389 describe modified systems of the aforementioned basic types. Essentially they are different in the center part of the lens configuration, as the anterior part preferably begins with two negative menisci and the posterior part concludes preferably with a refractive power sequence (successively from image to object) of one negative lens and two positive lenses. This anterior and posterior configuration can essentially be found in all systems. With respect to the aforementioned previously known systems, a system according to the invention has been successful in maintaining the provisions of bundle geometry according to claim 1 and achieving the necessary increase in projection quality primarily due to the different design of the center system's configuration (lenses 3 to lenses 6) and due to the special diaphragm position as well as a reduction in vignetting. This way, the system according to the invention was successful in considerably expanding the lens characteristics relevant to European patent application 00 100 890.3 by including shorter focal lengths, and therefore larger image angles, with only 2 additional lenses. Thus, the excellent projection quality of the aforementioned previously known system could be maintained for the same aperture relationship of 1:1.9 throughout the entire new focal length range and could in part be improved further. Excellent projection quality can be achieved independently from image field curvature (slightly curved or flat), as is further illustrated and clarified in an example.

In order to produce a gradual focal length series, which is necessary in order to adjust to projection conditions, using about the same type of glass for equivalent lenses offers a decisive technological advantage. Furthermore, only technologically advantageous, i.e. process and cost effective glass is used.

One preferred application of a projection lens according to the invention is the use of the lens alone, i.e. without additional components. It is entirely usual within the context of the invention to combine separate optical components with the projection lens. These components may, for example, be lens attachments or lens supplements, especially attachments for focal length variation and anamorphic attachments for panorama wide screen projection. It is conceivable to integrate attachments mechanically.

BRIEF DESCRIPTION OF THE DRAWINGS

FIG. 1.1a is a partial schematic, cross-sectional view of a lens system embodying the present invention.

FIG. 1.1b is a partial schematic, cross-sectional view of the lens system of FIG. 1, shown with flux progression and characteristic angles.

FIG. 1.2 is a graph of the vignetting progression of the 3 main colors for the lens system illustrated in FIGS. 1 and 2.

FIG. 1.3 is a graph of the meridional (tan) and sagittal (sag.) modulation transfer function MTF for the 3 main colors for the lens system illustrated in FIGS. 1 and 2.

FIG. 1.4 are graphs of transverse spherical aberrations for the 3 main colors in the lens system illustrated in FIGS. 1 and 2.

FIG. 1.5 is a graph of the astigmatism of the 3 main colors for the lens system illustrated in FIGS. 1 and 2.

FIG. 1.6 is a graph of the distortion of the 3 main colors of the lens system illustrated in FIGS. 1 and 2.

FIG. 2.1a is a partially schematic, cross-sectional view of another embodiment of the present invention.

FIG. 2.1b is a partially schematic, cross-sectional view of the lens system of FIG. 2.1a, shown with flux progression and characteristic angles.

FIG. 2.2 is a graph of the vignetting progression of the 3 main colors of the lens system illustrated in FIGS. 2.1a and 2.1b.

FIG. 2.3 is a graph of the meridional (tan) and sagittal (sag.) modulation transfer function MTF for the 3 main colors of the lens system illustrated in FIGS. 2.1a and 2.1b.

FIG. 2.4 are graphs of the transverse spherical aberrations for the 3 main colors of the lens system illustrated in FIGS. 2.1a and 2.1b.

FIG. 2.5 is a graph of the astigmatism for the 3 main colors of the lens system illustrated in FIGS. 2.1a and 2.1b.

FIG. 2.6 is a graph of the distortion of the 3 main colors of the lens system illustrated in FIGS. 2.1a and 2.1b.

FIG. 3.1a is partially schematic, cross-sectional view of yet another embodiment of the present invention.

FIG. 3.1b is a partial schematic, cross-sectional view of the lens system of FIG. 3.1a, shown with flux progression and characteristic angles.

FIG. 3.2 is a graph of the vignetting progression of the 3 main colors of the lens system illustrated in FIGS. 3.1a and 3.1b.

FIG. 3.3 is a graph of the meridional (tan) and sagittal (sag.) modulation transfer function MTF for the 3 main colors of the lens system illustrated in FIGS. 3.1a and 3.1b.

FIG. 3.4 are graphs of the transverse spherical aberrations for the 3 main colors of the lens system illustrated in FIGS. 3.1a and 3.1b.

FIG. 3.5 is a graph of the astigmatism for the 3 main colors of the lens system illustrated in FIGS. 3.1a and 3.1b.

FIG. 3.6 is a graph of the distortion of the 3 main colors of the lens system illustrated in FIGS. 3.1 and 3.1b.

DETAILED DESCRIPTION OF THE PREFERRED EMBODIMENT

Preliminary remarks:

For practical reasons, the cross-sectional views, flux progressions and evaluation of projection quality refer to a reversed position with respect to the projection lens position of use (projection from blow-up to reduction side) in all of the following illustrations. The initial back focal length is infinite. Therefore the original object is inevitably turned toward the image and reversed. This reversal is referenced colloquially or locally. An exception to this is pupil projection (orientation in position of use). This should be noted in the following explanations.

The following illustrations exhibit a luminous projection lens with a curved image field according to claim 3:

1.1a A cross-sectional view of the system with numbered lenses and flux progression on a meridional plane for the projection of different object points. The diaphragm is located between lenses 5 and 6.

1.1b A cross-sectional view of the system with flux progression on a meridional plane for the projection of the most outer object point (the object field's diagonal) and characteristic angles α RBa and α RBi with values: α RBa=5.0° and α RBi=17.5° for an entrance pupil position of LEP=169.3 mm.

Vignetting progression of the 3 main colors λ(d)=587.6 nm, λ(C)=656.3 nm and λ(F)=486.1 nm with weightings λ(d)=1, λ(C)=λ(F)=0.5, depending on half of image angle w(wmax=17.4°). The minimum vignetting value amounts to 80% and is rather essentially also determined by angle α RBa.

Meridional (tan) and sagittal (sag.) modulation transfer function MTF for the 3 main colors λ(d)=587.6 nm, λ(C)=656.3 nm and λ(F)=486.1 nm with weightings k(d)=1, λ(C)=λ(F)=0.5, depending on half of image angle w (wmax=17.4°) for spatial frequencies 60 LP/mm, 30 LP/mm and 15 LP/mm. A comparison to the aforementioned solutions (European patent application 00 100 890.3) shows a somewhat better and balanced projection quality throughout the entire image field. This is mostly apparent in the axis contrast increase at spatial frequencies of 60 LP/mm and 30 LP/mm as well as in the slight differences of meridional and sagittal curve progressions in the outer field area at 60 LP/mm.

Spherical aberrations Δy' and Δx' for the 3 main colors in the meridional (T) and sagittal (S) section, depending on entrance pupil radius pEP for half of image angle w=0, w=0.25×wmax, w=0.5×wmax, w=0.75×wmax as a parameter with w=wmax=17.4°. These curves show the corrective behavior, depending on the pupil and field coordinates for these 3 wavelengths. They confirm an excellent projection quality throughout the entire image field, as demonstrated already by the modulation transfer function's curve progression and provide deeper insight into the system's corrective behavior. They further illustrate excellent axial and lateral color correction.

Astigmatism for the 3 main colors depending on half of image angle (w=wmax=17.4). A somewhat more favorable progression of the image shells with respect to the aforementioned solution (European patent application 00 100 890.3) is noticeable.

Distortion of the 3 main colors depending on half of image angle (w=wmax=17.4). Distortion reaches a maximum deviation of 1.0% at the edge of the image.

Illustrations 2.1 to 2.6 illustrate the luminous projection lens with a curved image field according to claim 4 in the same manner as was the case in illustrations 1.1 to 1.6. The illustrations show:

2.1 A cross-sectional view of the system with numbered lenses and flux progression on the meridional plane for the projection of various object points. The diaphragm is located between lenses 5 and 6.

2.1 b A cross-sectional view of the system with flux progression on the meridional plane for a projection of the most outer object point (object field's diagonal) and characteristic angles α RBa and α RBi with values: α RBa=4.2° and α RBi=17.7° for an entrance pupil position of LEP= 178.3 mm.

2.2 follows illustration 1.2. Minimum vignetting value is 77% at half the image angle of w=wmax=19.5°.

2.3 follows illustration 1.3. The statements in 1.3 apply specifically also for is lens' projection quality with a larger half image angle of w=wmax=19.5°.

2.4, 2.5 and 2.6 follow illustrations 1.4, 1.5 and 1.6 for half of image angle w=wmax=19.5, whereby their statements comparatively also apply to these illustrations.

Illustrations 3.1 to 3.6 describe a luminous projection lens with a flat image field according to claim 5 in the same manner as is the case in illustrations 2.1 to 2.6. The illustrations show:

3.1a A cross-sectional view of the system with numbered lenses and flux progression in the meridional plane for the projection of different object points. The diaphragm is located between lenses 5 and 6.

3.1b A cross-sectional view of the system with flux progression in the meridional plane for a projection of the most outer object point (the object field's diagonal) and characteristic angles α RBa and α RBi with values: α RBa=4.2° and α RBi=17.7° for an entrance pupil position of LEP=176.6 mm.

3.2 follows illustration 2.2. The minimum vignetting value amounts to 78% with a half image angle of w=wmax=19.5°.

3.3 follows illustration 2.3. Both systems of equal focal length, which are different only in their field curvatures (curved and flat), show a virtually identical MTF curve progression and are therefore equivalent as far as their projection quality is concerned.

3.4, 3.5 and 3.6 follow illustrations 2.4, 2.5 and 2.6 with a half image angle of w=wmax=19.5°, whereby those statements apply comparatively also for these illustrations.

Illustrations 3.1 to 3.6, which describe the system and all projection errors, were to show especially that the system configuration devised in the above claims is also suitable for flat image fields, and that is with the same projection performance while considering all projection errors.

Preferably, a projection objective lens assembly for projecting a projected object from an image comprises nine lenses bordering to space on both sides. The nine lenses include, from an image side to an object side:
- a first negative meniscus shaped lens with the convex surface on the image side;
- a second negative meniscus shaped lens, with a convex surface on the image side;
- a third positive lens, with a convex surface on the object side;
- a fourth positive meniscus shaped lens lens, with a convex surface on the image side;
- a fifth negative lens, with a concave surface on the object side;
- a sixth biconvex lens;
- a seventh biconcave lens;
- a eighth positive lens, with the convex surface on the object side; and
- a ninth positive lens, with the convex surface on the image side.

Each of the nine lenses include an aperture angle on the object side greater than or equal to about 12.8°, a distance of the entrance pupil on the illumination side from the object plane equal to or from about 100 mm to about 400 mm, an outward angular tilt with respect to the optical axis in the space between the object and the first lens surface of the lens, delimiting the bundle for the field edge (objects outer field point) towards the exterior (away from the optical axis, axis-remote) greater than or equal to about 1°, and an inward angular tilt with respect to the optical axis in the space between the object and the first lens surface of the lens, which delimits the bundle for the field edge (objects outer field point) towards the interior (towards the optical axis, axis-close) less than or equal to about −14°. The outward ray angle tilt and the inward ray angle tilt are positive if the outward ray and the inward ray intersect the optical axis at a location which, when seen from the object, is in an opposite direction to projection. The outward ray angle tilt and the inward ray tilt are negative if the outward ray and the inward ray intersect the optical axis at a location which, when seen from the object, is in the direction of projection.

In another embodiment, the projection objective assembly includes a first space located to the image side of the first lens, a second space located between the first lens and the second lens, a third space located between the second lens and the third lens, a fourth space located between the third lens and the fourth lens, a fifth space located between the fourth lens and the fifth lens, a sixth space located between the fifth lens and the six lens, a seventh space located between the sixth lens and the seventh lens, a eighth space located between the seventh lens and the eighth lens, and a ninth space located between the eighth lens and the ninth lens.

The image side of the first lens has a refractive surface radius divided by a focal distance of the projection objective lens assembly between about 1.64 mm and about 6.14 mm, and a refractive index of about 1.0000.

The object side of the first lens has a refractive surface radius divided by a focal distance of the projection objective lens assembly between about 0.64 mm and about 2.26 mm, a vertex distance between the image side of the first lens and the object side of the first lens divided by the focal distance of the projection objective lens assembly of between about 0.10 and about 0.44, a refractive index greater than about 1.48, and an Abbe value of greater than about 50.

The image side of the second lens has a refractive surface radius divided by a focal distance of the projection objective lens assembly between about 2.53 mm and about 21.9 mm, a vertex distance between the image side of the second lens and the object side of the first lens divided by the focal distance of the projection objective lens assembly of between about 0.10 and about 0.53. The second space has a refractive index of about 1.0000.

The object side of the second lens has a refractive surface radius divided by a focal distance of the projection objective lens assembly between about 0.92 mm and about 3.30 mm, a vertex distance between the object side of the second lens and the image side of the second lens divided by the focal distance of the projection objective lens assembly of between about 0.08 and about 0.40, a refractive index greater than about 1.48, and an Abbe value of greater than about 50.

The image side of the third lens has a refractive radius divided by a focal distance of the projection objective lens assembly less than about −7.05 mm or above about 1.04 mm, a vertex distance between the image side of the third lens and the object side of the second lens divided by the focal distance of the projection objective lens assembly of between about 0.20 and about 2.22. The third space has a refractive index of about 1.0000.

The object side of the third lens has a refractive surface radius divided by a focal distance of the projection objective lens assembly between about −3.20 mm and about −1.36 mm, a vertex distance between the object side of the third lens and the image side of the third lens divided by the focal distance of the projection objective lens assembly of between about 0.16 and about 0.71, a refractive index greater than about 1.58, and an Abbe value of greater than about 35.

The image side of the fourth lens has a refractive radius divided by a focal distance of the projection objective lens assembly between about 0.52 mm and 2.15 mm, a vertex distance between the image side of the fourth lens and the object side of the third lens divided by the focal distance of the projection objective lens assembly of between about 0.002 and about 2.00. The fourth space has a refractive index of about 1.0000.

The object side of the fourth lens has a refractive radius divided by a focal distance of the projection objective lens assembly between about 1.44 mm and about 28.50 mm, a vertex distance between the object side of the fourth lens and the image side of the fourth lens divided by the focal distance of the projection objective lens assembly of between about 0.14 and about 0.62, a refractive index greater than about 1.60, and an Abbe value greater than about 37.

The image side of the fifth lens has a refractive radius divided by a focal distance of the projection objective lens assembly less than about −1.72 mm or above about 10.00 mm, a vertex distance between the image side of the fifth lens and the object side of the fourth lens divided by the focal distance of the projection objective lens assembly of between about 0.012 and about 0.53. The fifth space has a refractive index of about 1.0000.

The object side of the fifth lens has a refractive radius divided by a focal distance of the projection objective lens assembly between about 0.31 mm and about 1.20 mm, a vertex distance between the object side of the fifth lens and the image side of the fifth lens divided by the focal distance of the projection objective lens assembly of between about 0.036 and about 0.36, a refractive index greater than about 1.50, and an Abbe value of less than about 55.

The image side of the sixth lens has a refractive radius divided by a focal distance of the projection objective lens assembly between about 0.99 mm and about 5.40 mm, a vertex distance between the image side of the sixth lens and the object side of the fifth lens divided by the focal distance of the projection objective lens assembly of between about 0.04 and about 1.33. The sixth space has a refractive index of about 1.0000.

The object side of the sixth lens has a refractive radius divided by a focal distance of the projection objective lens assembly between about −2.15 mm and about −0.50 mm, a vertex distance between the object side of the sixth lens and the image side of the sixth lens divided by the focal distance of the projection objective lens assembly of between about 0.14 and about 0.67, a refractive index greater than about 1.60, and an Abbe value of greater than about 37.

The image side of the seventh lens has a refractive radius divided by a focal distance of the projection objective lens assembly between about −1.75 nun and about −0.53 mm, a vertex distance between the image side of the seventh lens and the object side of the sixth lens divided by the focal distance of the projection objective lens assembly of between about 0.001 and about 0.71. The seventh space has a refractive index of about 1.0000.

The object side of the seventh lens has a refractive radius divided by a focal distance of the projection objective lens assembly between about 0.76 mm and about 3.17 mm, a vertex distance between the object side of the seventh lens and the image side of the seventh lens divided by the focal distance of the projection objective lens assembly of between about 0.03 and about 0.40, a refractive index greater than about 1.60, and an Abbe value of less than about 40.

The image side of the eighth lens has a refractive radius divided by a focal distance of the projection objective lens assembly less than about −32.00 mm or above about 1.12 mm, a vertex distance between the image side of the eighth lens and the object side of the seventh lens divided by the focal distance of the projection objective lens assembly of between about 0.004 and about 0.44. The eighth space has a refractive index of about 1.0000.

The object side of the eighth lens has a refractive radius divided by a focal distance of the projection objective lens assembly between about −1.88 mm and about −0.76 mm, a vertex distance between the object side of the eighth lens and the image side of the eighth lens divided by the focal distance of the projection objective lens assembly of between about 0.12 and about 0.67, a refractive index greater than about 1.58, and an Abbe value of greater than about 45

The image side of the ninth lens has a refractive radius divided by a focal distance of the projection objective lens assembly between about 0.79 mm and 3.99 mm, a vertex distance between the image side of the ninth lens and the object side of the eighth lens divided by the focal distance of the projection objective lens assembly of between about 0.002 and about 0.53. The ninth space has a refractive index of about 1.0000.

The object side of the ninth lens has a refractive radius divided by a focal distance of the projection objective lens assembly less than about −1.79 mm or above about 1.32 mm, a vertex distance between the object side of the ninth lens and the image side of the ninth lens divided by the focal distance of the projection objective lens assembly of between about 0.12 and about 0.67, a refractive index greater than about 1.58, and an Abbe value of greater than about 45.

In yet another embodiment, the image side of the first lens has a refractive radius of about 122.693 mm. The first space has a refractive index of about 1.0000.

The object side of the first lens has a refractive radius of about 36.880 mm, a vertex distance between the object side of the first lens and the image side of the first lens of about 5.982 mm, a refractive index of about 1.51633, and an Abbe value of about 64.12.

The image side of the second lens has a refractive radius of about 199.620 mm, a vertex distance between the image side of the second lens and the object side of the first lens of about 7.186 mm. The second space has a refractive index of about 1.0000.

The object side of the second lens has a refractive radius of about 79.490 mm, a vertex distance between the object side of the second lens and the image side of the second lens of about 5.990 mm, a refractive index of about 1.51633, and an Abbe value of about 64.12.

The image side of the third lens has a refractive radius of about 63.191 mm, a vertex distance between the image side of the third lens and the object side of the second lens of about 14.491 mm. The third space has a refractive index of about 1.0000.

The object side of the third lens has a refractive radius of about −86.796 mm, a vertex distance between the object side of the third lens and the image side of the third lens of about 12.851 mm, a refractive index of about 1.65159, and an Abbe value of about 58.53.

The image side of the fourth lens has a refractive radius of about 30.487 mm, a vertex distance between the image side of the fourth lens and the object side of the third lens of about 2.267 mm. The fourth space has a refractive index of about 1.0000.

The object side of the fourth lens has a refractive radius of about 72.451 mm, a vertex distance between the object side of the fourth lens and the image side of the fourth lens of about 9.031 mm, a refractive index of about 1.72915, and an Abbe value of about 54.66.

The image side of the fifth lens has a refractive radius of about 773.151 mm, a vertex distance between the image side of the fifth lens and the object side of the fourth lens of about 4.593 mm. The fifth space has a refractive index of about 1.0000.

The object side of the fifth lens has a refractive radius of about 17.137 mm, a vertex distance between the object side of the fifth lens and the image side of the, fifth lens of about 2.995 mm, a refractive index of about 1.61293, and an Abbe value of about 36.98.

A diaphragm exists between the object side of the fifth lens and the image side of the sixth lens. The diaphragm has a distance of about 5.478 mm.

The image side of the sixth lens has a refractive radius of about 179.965 mm, and a vertex distance of about 15.990 mm. The sixth space has a refractive index of about 1.0000.

The object side of the sixth lens has a refractive radius of about −25.281 mm, a vertex distance between the object side of the sixth lens and the image side of the sixth lens of about 9.649 mm, a refractive index of about 1.65159, and an Abbe value of about 58.53.

The image side of the seventh lens has a refractive radius of about −27.786 mm, a vertex distance between the image side of the seventh lens and the object side of the sixth lens of about 0.160 mm. The seventh space has a refractive index of about 1.0000.

The object side of the seventh lens has a refractive radius of about 52.714 mm, a vertex distance between the object side of the seventh lens and the image side of the seventh lens of about 2.975 mm, a refractive index of about 1.62588, and an Abbe value of about 35.68.

The image side of the eighth lens has a refractive radius of about 70.421 mm, a vertex distance between the image side of the eighth lens and the object side of the seventh lens of about 1.519 mm. The eighth space has a refractive index of about 1.0000.

The object side of the eighth lens has a refractive radius of about −40.057 mm, a vertex distance between the object side of the eighth lens and the image side of the eighth lens of about 10.584 mm, a refractive index of about 1.6031 1, and an Abbe value of about 60.62.

The image side of the ninth lens has a refractive radius of about 57.554 mm, a vertex distance between the image side of the ninth lens and the object side of the eighth lens of about 0.174 mm, and a refractive index of about 1.0000.

The object side of the ninth lens has a refractive radius of about 205.974 mm, a vertex distance between the object side of the ninth lens and the image side of the ninth lens of about 10.853 mm, a refractive index of about 1.60311, and an Abbe value of about 60.62.

The projection objective lens assembly has a focal distance of is about 45 mm, a back focal length of 32.7 mm, a relative aperture of 1:1.9, an image angle of 2w=34.8°, and a curved object field.

In another embodiment, the image side of the fist lens has a refractive radius of about 137.680 mm. The first space has a refractive index of about 1.0000.

The object side of the first lens has a refractive radius of about 41.020 mm, a vertex distance between the object side of the first lens and the image side of the first lens of about 7.000 mm, a refractive index of about 1.51633, and an Abbe value of about 64.12.

The image side of the second lens has a refractive radius of about 260.045 mm, a vertex distance between the image side of the second lens and the object side of the first lens of about 7.069 mm. The second space has a refractive index of about 1.0000.

The object side of the second lens has a refractive radius of about 54.856 mm, a vertex distance between the object side of the second lens and the image side of the second lens of about 6.500 mm, a refractive index of about 1.51633, and an Abbe value of about 64.12.

The image side of the third lens has a refractive radius of about 78.528 mm, a vertex distance between the image side of the third lens and the object side of the second lens of about 19.854 mm. The third space has a refractive index of about 1.0000.

The object side of the third lens has a refractive radius of about −80.224 mm, a vertex distance between the object side of the third lens and the image side of the third lens of about 13.000 mm, a refractive index of about 1.65159, and an Abbe value of about 58.53.

The image side of the fourth lens has a refractive radius of about 31.339 mm, a vertex distance between the image side of the fourth lens and the object side of the third lens of about 11.971 mm. The fourth space has a refractive index of about 1.0000.

The object side of the fourth lens has a refractive radius of about 90.962 mm, a vertex distance between the object side of the fourth lens and the image side of the fourth lens of about 9.500 mm, a refractive index of about 1.72915, and an Abbe value of about 54.66.

The image side of the fifth lens has a refractive radius of about −1587.324 mm, a vertex distance between the image side of the fifth lens and the object side of the fourth lens of about 1.293 mm, and a refractive index of about 1.0000.

The object side of the fifth lens has a refractive radius of about 18.526 mm, a vertex distance between the object side of the fifth lens and the image side of the fifth lens of about 4.000 mm, a refractive index of about 1.56732, and an Abbe value of about 42.8 1.

A diaphragm exists between the object side of the fifth lens and the image side of the sixth lens. The diaphragm has a distance of about 5.336 mm.

The image side of the sixth lens has a refractive radius of about 136.010 mm, and a vertex distance of about 17.679 mm. The sixth space has a refractive index of about 1.0000.

The object side of the sixth lens has a refractive radius of about −29.021 nun, a vertex distance between the object side of the sixth lens and the image side of the sixth lens of about 10.000 mm, a refractive index of about 1.72915, and an Abbe value of about 54.66.

The image side of the seventh lens has a refractive radius of about −32.146 mm, a vertex distance between the image side of the seventh lens and the object side of the sixth lens of about 0.093 mm. The seventh space has a refractive index of about 1.0000.

The object side of the seventh lens has a refractive radius of about 51.817 mm, a vertex distance between the object side of the seventh lens and the image side of the seventh lens of about 4.000 mm, a refractive index of about 1.66680, and an Abbe value of about 33.04.

The image side of the eighth lens has a refractive radius of about 71.486 mm, a vertex distance between the image side of the eighth lens and the object side of the seventh lens of about 0.814 mm. The eighth space has a refractive index of about 1.0000.

The object side of the eighth lens has a refractive radius of about −45.788 mm, a vertex distance between the object side of the eighth lens and the image side of the eighth lens of about 1 1.000 mm, a refractive index of about 1.60311, and an Abbe value of about 60.62.

The image side of the ninth lens has a refractive radius of about 64.776 mm, a vertex distance between the image side of the ninth lens and the object side of the eighth lens of about 1.837 mm, and a refractive index of about 1.0000.

The object side of the ninth lens has a refractive radius of about 358.885 mm, a vertex distance between the object side of the ninth lens and the image side of the ninth lens of about 9.000 mm, a refractive index of about 1.60311, and an Abbe value of about 60.62.

The projection objective lens assembly has a focal distance of about 40 mm, a back focal length of 35 mm, a relative aperture of 1:1.9, an image angle of 2w=39°, and a curved object field.

In still another embodiment, the image side of the first lens has a refractive radius of about 135.549 mm. The first space has a refractive index of about 1.0000.

The object side of the first lens has a refractive radius of about 40.596 mm, a vertex distance between the object side of the first lens and the image side of the first lens of about 7.000 mm, a refractive index of about 1.51633, and an Abbe value of about 64.12.

The image side of the second lens has a refractive radius of about 222.537 mm, a vertex distance between the image side of the second lens and the object side of the first lens of about 6.956 mm. The second space has a refractive index of about 1.0000.

The object side of the second lens has a refractive radius of about 53.985 mm, a vertex distance between the object side of the second lens and the image side of the second lens of about 6.500 mm, a refractive index of about 1.51633, and an Abbe value of about 64.12.

The image side of the third lens has a refractive radius of about 78.774 mm, a vertex distance between the image side of the third lens and the object side of the second lens of about 20.642 mm. The third space has a refractive index of about 1.0000.

The object side of the third lens has a refractive radius of about −79.537 mm, a vertex distance between the object side of the third lens and the image side of the third lens of about 13.000 mm, a refractive index of about 1.65159, and an Abbe value of about 58.53.

The image side of the fourth lens has a refractive radius of about 30.776 mm, a vertex distance between the image side of the fourth lens and the object side of the third lens of about 11.353 mm. The fourth space has a refractive index of about 1.0000.

The object side of the fourth lens has a refractive radius of about 87.075 mm, a vertex distance between the object side of the fourth lens and the image side of the fourth lens of about 9.500 mm, a refractive index of about 1.72915, and an Abbe value of about 54.66.

The image side of the fifth lens has an infinite refractive radius, a vertex distance between the image side of the fifth lens and the object side of the fourth lens of about 1.296 mm. The fifth space has a refractive index of about 1.0000.

The object side of the fifth lens has a refractive radius of about 18.416 mm, a vertex distance between the object side of the fifth lens and the image side of the fifth lens of about 4.000 mm, a refractive index of about 1.56732, and an Abbe value of about 42.81.

A diaphragm exists between the object side of the fifth lens and the image side of the sixth lens. The diaphragm has a distance of about 5.334 mm.

The image side of the sixth lens has a refractive radius of about 147.728 mm, and a vertex distance of about 17.769 mm. The sixth space has a refractive index of about 1.0000.

The object side of the sixth lens has a refractive radius of about −28.893 mm, a vertex distance between the object side of the sixth lens and the image side of the sixth lens of about 10.000 mm, a refractive index of about 1.72915, and an Abbe value of about 54.66.

The image side of the seventh lens has a refractive radius of about −32.267 mm, a vertex distance between the image side of the seventh lens and the object side of the sixth lens of about 0.114 mm. The seventh space has a refractive index of about 1.0000.

The object side of the seventh lens has a refractive radius of about 53.439 mm, a vertex distance between the object side of the seventh lens and the image side of the seventh lens of about 4.000 mm, a refractive index of about 1.68893, and an Abbe value of about 31.06.

The image side of the eighth lens has a refractive radius of about 81.611 mm, a vertex distance between the image side of the eighth lens and the object side of the seventh lens of about 1.898 mm. The eighth space has a refractive index of about 1.0000.

The object side of the eighth lens has a refractive radius of about −51.483 mm, a vertex distance between the object side of the eighth lens and the image side of the eighth lens of about 11.000 mm, a refractive index of about 1.72915, and an Abbe value of about 54.66.

The image side of the ninth lens has a refractive radius of about 67.997 mm, a vertex distance between the image side of the ninth lens and the object side of the eight lens of about 0.580 mm, and a refractive index of about 1.0000.

The object side of the ninth lens has a refractive radius of about 156.001 mm, a vertex distance between the object side of the ninth lens and the image side of the ninth lens of about 9.000 mm, a refractive index of about 1.72915, and an Abbe value of about 54.66.

The projection objective lens assembly has a focal distance of about 40 mm, a back focal length of 34.9 mm, a relative aperture of 1:1.9, an image angle of 2w=39°, and a flat object field.

What is claimed is:

1. A projection lens having nine lenses bordering to space on both sides, comprising following:

$u \geq 212.8°$, 100 mm $\leq$ LEP $\leq$ 400 mm, $\alpha\ Rba \geq 1°$, $\alpha\ Rbi \leq -14°$, whereby u is the aperture angle (2u-entire angle) on the illumination side, LEP is the distance of the entrance pupil (on the illumination side) from the object plane (position in the direction of projection from the reference point of the object plane is a positive value), α RBa is the beam's angular tilt with respect to the optical axis in the object space between the object and the first lens surface of the lens delimiting the bundle for the field edge (object's outer field point) towards the exterior (away from the optical axis, axis-remote) and α RBi is the beam's angular tilt with respect to the optical axis in the object space between the object and the first lens surface of the lens, which delimits the bundle for the field edge (object's outer field point) towards the interior (towards the optical axis, axis-close), as well as that angles α RBa and α RBi am positive, if the respective beams intersect the optical axis at a point, which, when seen from the object, lies in the opposite direction of projection and negative, if they intersect the optical axis at a point, which, when seen from the object, lies in the direction of projection, with the following lens positions starting in sequence from the image (blow-up side) towards the object (reduction and illumination side):

a first negative, meniscus-shaped lens (1), with the convex surface on the image side, a second negative, meniscus-shaped lens (2), with the convex surface on the image side, a third positive lens (3), with a convex surface on the object side, a fourth positive, meniscus-shaped lens (4), with a convex surface on the image side, a fifth negative lens (5), with a concave surface on the object side, a sixth biconvex lens (6), a seventh biconcave lens (7), an eighth positive lens (8), with a convex surface on the object side, a ninth positive lens (9), with a convex surface on the image side.

2. A projection objective lens assembly for projecting a projected object from an image comprising:

nine lenses bordering to space on both sides, the nine lenses include, from an image side to an object side including:

a first negative meniscus shaped lens with the convex surface on the image side;

a second negative meniscus shaped lens, with a convex surface on the image side;

a third positive lens, with a convex surface on the object side;

a fourth positive meniscus shaped lens, with a convex surface on the image side;

a fifth negative lens, with a concave surface on the object side;

a sixth biconvex lens;

a seventh biconcave lens;

a eighth positive lens, with the convex surface on the object side; and a ninth positive lens, with the convex surface on the image side;

wherein each of the nine lenses include an aperture angle on the object side greater than or equal to about 12.8°, a distance of the entrance pupil on the illumination side from the object plane equal to or from about 100 mm to about 400 mm, an outward angular tilt with respect to the optical axis in the space between the object and the first lens surface of the lens, delimiting the bundle for the field edge (objects outer field point) towards the exterior (away from the optical axis, axis-remote) of greater than or equal to about 1°, and an inward angular tilt with respect to the optical axis in the space between the object and the first lens surface of the lens, which delimits the bundle for the field edge (objects outer field point) towards the interior (towards the optical axis, axis-close) of less than or equal to about −14°;

wherein further the outward ray angle tilt and the inward ray angle tilt are positive if the outward ray and the inward ray intersect the optical axis at a location which, when seen from the object, is in an opposite direction of projection; and wherein the outward ray angle tilt and the inward ray angle tilt are negative if the outward ray and the inward ray intersect the optical axis at a location which, when seen from the object, is in the direction of projection.

3. The projection objective assembly of claim 2, further including:

a first space located to the image side of the first lens;

a second space located between the first lens and the second lens;

a third space located between the second lens and the third lens, a fourth space located between the third lens and the fourth lens;

a fifth space located between the fourth lens and the fifth lens;

a sixth space located between the fifth lens and the six lens;

a seventh space located between the sixth lens and the seventh lens;

a eighth space located between the seventh lens and the eighth lens; and and a ninth space located between the eighth lens and the ninth lens;

wherein:

the projection objective assembly includes a first space located to the image side of the first lens, a second space located between the first lens and the second lens, a third space located between the second lens and the third lens, a fourth space located between the third lens and the fourth lens, a fifth space located between the fourth lens and the fifth lens, a sixth space located between the fifth lens and the six lens, a seventh space located between the sixth lens and the seventh lens, a eighth space located between the seventh lens and the eighth lens, and a ninth space located between the eighth lens and the ninth lens;

the image side of the first lens has a refractive surface radius divided by a focal distance of the projection objective lens assembly between about 1.64 mm and about 6.14 mm, and a refractive index of about 1.0000;

the object side of the first lens has a refractive surface radius divided by a focal distance of the projection objective lens assembly between about 0.64 mm and about 2.26 mm, a vertex distance between the image side of the first lens and the object side of the first lens divided by the focal distance of the projection objective lens assembly of between about 0.10 and about 0.44, a refractive index greater than about 1.48, and an Abbe value of greater than about 50;

the image side of the second lens has a refractive surface radius divided by a focal distance of the projection objective lens assembly between about 2.53 mm and about 21.9 mm, a vertex distance between the image side of the second lens and the object side of the first lens divided by the focal distance of the projection objective lens assembly of between about 0.10 and about 0.53, the second space has a refractive index of about 1.0000;

the object side of the second lens has a refractive surface radius divided by a focal distance of the projection objective lens assembly between about 0.92 mm and about 3.30 mm, a vertex distance between the object side of the second lens and the image side of the second lens divided by the focal distance of the projection objective lens assembly of between about 0.08 and about 0.40, a refractive index greater than about 1.48, and an Abbe value of greater than about 50;

the image side of the third lens has a refractive radius divided by a focal distance of the projection objective lens assembly less than about −7.05 mm or above about 1.04 mm, a vertex distance between the image side of the third lens and the abject side of the second lens divided by the focal distance of the projection objective lens assembly of between about 0.20 and about 2.22, the third space has a refractive index of about 1.000;

the object side of the third lens has a refractive surface radius divided by a focal distance of the projection objective lens assembly between about −3.20 mm and about −1.36 mm, a vertex distance between the object side of the third lens and the image side of the third lens divided by the focal distance of the projection objective lens assembly of between about 0.16 and about 0.71, a refractive index greater than about 1.58, and an Abbe value of greater than about 35;

the image side of the fourth lens has a refractive radius divided by a focal distance of the projection objective lens assembly between about 0.52 mm and 2.15 mm, a vertex distance between the image side of the fourth lens and the object side of the third lens divided by the focal distance of the projection objective lens assembly of between about 0.002 and about 2.00, the fourth space has a refractive index of about 1.0000;

the object side of the fourth lens has a refractive radius divided by a focal distance of the projection objective lens assembly between about 1.44 mm and about 28.50 mm, a vertex distance between the object side of the fourth lens and the image side of the fourth lens divided by the focal distance of the projection objective lens assembly of between about 0.14 and about 0.62, a refractive index greater than about 1.60, and an Abbe value greater than about 37;

the image side of the fifth lens has a refractive radius divided by a focal distance of the projection objective lens assembly less than about −1.72 mm or above about 10.00 mm, a vertex distance between the image side of the fifth lens and the object side of the fourth lens divided by the focal distance of the projection objective lens assembly of between about 0.012 and about 0.53, the fifth space has a refractive index of about 1.0000;

the object side of the fifth lens has a refractive radius divided by a focal distance of the projection objective lens assembly between about 0.31 mm and about 1.20 mm, a vertex distance between the object side of the fifth lens and the image side of the fifth lens divided by the focal distance of the projection objective lens assembly of between about 0.036 and about 0.36, a refractive index greater than about 1.50, and an Abbe value of less than about 55;

the image side of the sixth lens has a refractive radius divided by a focal distance of the projection objective lens assembly between about 0.99 mm and about 5.40 mm, a vertex distance between the image side of the sixth lens and the object side of the fifth lens divided by the focal distance of the projection objective lens assembly of between about 0.04 and about 1.33, the sixth space has a refractive index of about 1.0000;

the object side of the sixth lens has a refractive radius divided by a focal distance of the projection objective lens assembly between about −2.15 mm and about −0.50 mm, a vertex distance between the object side of the sixth lens and the image side of the sixth lens divided by the focal distance of the projection objective lens assembly of between about 0.14 and about 0.67, a refractive index greater than about 1.60, and an Abbe value of greater than about 37;

the image side of the seventh lens has a refractive radius divided by a focal distance of the projection objective lens assembly between about −1.75 mm and about 0.53 mm, a vertex distance between the image side of the seventh lens and the object side of the sixth lens divided by the focal distance of the projection objective lens assembly of between about 0.001 and about 0.71, the seventh space has a refractive index of about 1.0000;

the object side of the seventh lens has a refractive radius divided by a focal distance of the projection objective lens assembly between about 0.76 mm and about 3.17 mm, a vertex distance between the object side of the seventh lens and the image side of the seventh lens divided by the focal distance of the projection objective lens assembly of between about 0.03 and about 0.40, a refractive index greater than about 1.60, and an Abbe value of less than about 40;

the image side of the eighth lens has a refractive radius divided by a focal distance of the projection objective lens assembly less than about −32.00 mm or above about 1.12 mm, a vertex distance between the image side of the eighth lens and the object side of the seventh lens divided by the focal distance of the projection objective lens assembly of between about 0.004 and about 0.44, the eighth space has a refractive index of about 1.0000.

the object side of the eighth lens has a refractive radius divided by a focal distance of the projection objective lens assembly between about −1.88 mm and about 0.76 mm, a vertex distance between the object side of the eighth lens and the image side of the eighth lens divided by the focal distance of the projection objective lens assembly of between about 0.12 and about 0.67, a refractive index greater than about 1.58, and an Abbe value of greater than about 45;

the image side of the ninth lens has a refractive radius divided by a focal distance of the projection objective lens assembly between about 0.79 mm and 3.99 mm, a vertex distance between the image side of the ninth lens and the object side of the eighth lens divided by the focal distance of the projection objective lens assembly of between about 0.002 and about 0.53, the ninth space has a refractive index of about 1.0000; and the object side of the ninth lens has a refractive radius divided by a focal distance of the projection objective lens assembly less than about −1.79 mm or above about 1.32 mm, a vertex distance between the object side of the ninth lens and the image side of the ninth lens divided by the focal distance of the projection objective lens assembly of between about 0.12 and about 0.67, a refractive index greater than about 1.58, and an Abbe value of greater than about 45.

4. The projection objective assembly of claim 3, wherein:

the image side of the first lens has a refractive radius of about 122.693 mm, the first space has a refractive index of about 1.0000;

the object side of the first lens has a refractive radius of about 36.880 mm, a vertex distance between the object side of the first lens and the image side of the first lens of about 5.982 mm, a refractive index of about 1.51633, and an Abbe value of about 64.12;

the image side of the second lens has a refractive radius of about 199.620 mm, a vertex distance between the image side of the second lens and the object side of the first lens of about 7.186 mm, the second space has a refractive index of about 1.0000;

the object side of the second lens has a refractive radius of about 79.490 mm, a vertex distance between the object side of the second lens and the image side of the second lens of about 5.990 mm, a refractive index of about 1.51633, and an Abbe value of about 64.12;

the image side of the third lens has a refractive radius of about 63.191 mm, a vertex distance between the image side of the third lens and the object side of the second lens of about 14.491 mm, the third space has a refractive index of about 1.0000;

the object side of the third lens has a refractive radius of about −86.796 mm, a vertex distance between the object side of the third lens and the image side of the third lens of about 12.851 mm, a refractive index of about 1.65159, and an Abbe value of about 58.53;

the image side of the fourth lens has a refractive radius of about 30.487 mm, a vertex distance between the image side of the fourth lens and the object side of the third lens of about 2.267 mm, the fourth space has a refractive index of about 1.0000;

the object side of the fourth lens has a refractive radius of about 72.451 mm, a vertex distance between the object side of the fourth lens and the image side of the fourth lens of about 9.031 mm, a refractive index of about 1.72915, and an Abbe value of about 54.66;

the image side of the fifth lens has a refractive radius of about 773.151 mm, a vertex distance between the image side of the fifth lens and the object side of the fourth lens of about 4.593 mm, the fifth space has a refractive index of about 1.0000;

the object side of the fifth lens has a refractive radius of about 17.137 mm, a vertex distance between the object side of the fifth lens and the image side of the fifth lens of about 2.995 mm, a refractive index of about 1.61293, and an Abbe value of about 36.98;

a diaphragm exists between the object side of the fifth lens and the image side of the sixth lens, the diaphragm has a distance of about 5.478 mm;

the image side of the sixth lens has a refractive radius of about 179.965 mm, and a vertex distance of about 15.990 mm, the sixth space has a refractive index of about 1.0000;

the object side of the sixth lens has a refractive radius of about −25.281 mm, a vertex distance between the object side of the sixth lens and the image side of the sixth lens of about 9.649 mm, a refractive index of about 1.65159, and an Abbe value of about 58.53;

the image side of the seventh lens has a refractive radius of about −27.786 mm, a vertex distance between the image side of the seventh lens and the object side of the sixth lens of about 0.160 mm, the seventh space has a refractive index of about 1.0000;

the object side of the seventh lens has a refractive radius of about 52.714 mm, a vertex distance between the object side of the seventh lens and the image side of the seventh lens of about 2.975 mm, a refractive index of about 1.62588, and an Abbe value of about 35.68;

the image side of the eighth lens has a refractive radius of about 70.421 mm, a vertex distance between the image side of the eighth lens and the object side of the seventh lens of about 1.519 mm, the eighth space has a refractive index of about 1.0000;

the object side of the eighth lens has a refractive radius of about −40.057 mm, a vertex distance between the object side of the eighth lens and, the image side of the eighth lens of about 10.584 mm, a refractive index of about 1.60311, and an Abbe value of about 60.62;

the image side of the ninth lens has a refractive radius of about 57.554 mm, a vertex distance between the image side of the ninth lens and the object side of the eighth lens of about 0.174 mm, and a refractive index of about 1.0000;

the object side of the ninth lens has a refractive radius of about 205.974 mm, a vertex distance between the object side of the ninth lens and the image side of the ninth lens of about 10.853 mm, a refractive index of about 1.60311, and an Abbe value of about 60.62; and the projection objective lens assembly has a focal distance of is about 45 mm, a back focal length of 32.7 mm, a relative aperture of 1:1.9, an image angle of 2w=34.81, and a curved object field.

5. The projection objective assembly of claim 3, wherein:

the image side of the fist lens has a refractive radius of about 137.680 mm, the first space has a refractive index of about 1.0000;

the object side of the first lens has a refractive radius of about 41.020 mm, a vertex distance between the object side of the first lens and the image side of the first lens of about 7.000 mm, a refractive index of about 1.51633, and an Abbe value of about 64.12;

the image side of the second lens has a refractive radius of about 260.045 mm, a vertex distance between the image side of the second lens and the object side of the first lens of about 7.069 mm, the second space has a refractive index of about 1.0000;

the object side of the second lens has a refractive radius of about 54.856 mm, a vertex distance between the object side of the second lens and the image side of the second lens of about 6.500 mm, a refractive index of about 1.51633, and an Abbe value of about 64.12;

the image side of the third lens has a refractive radius of about 78.528 mm, a vertex distance between the image side of the third lens and the object side of the second lens of about 19.854 mm, the third space has a refractive index of about 1.0000;

the object side of the third lens has a refractive radius of about −80.224 mm, a vertex distance between the object side of the third lens and the image side of the third lens of about 13.000 mm, a refractive index of about 1.65159, and an Abbe value of about 58.53;

the image side of the fourth lens has a refractive radius of about 31.339 mm, a vertex distance between the image side of the fourth lens and the object side of the third lens of about 11.971 mm, the fourth space has a refractive index of about 1.0000;

the object side of the fourth lens has a refractive radius of about 90.962 mm, a vertex distance between the object side of the fourth lens and the image side of the fourth lens of about 9.500 mm, a refractive index of about 1.72915, and an Abbe value of about 54.66;

the image side of the fifth lens has a refractive radius of about −1587.324 mm, a vertex distance between the image side of the fifth lens and the object side of the fourth lens of about 1.293 mm, and a refractive index of about 1.0000;

the object side of the fifth lens has a refractive radius of about 18.526 mm, a vertex distance between the object side of the fifth lens and the image side of the fifth lens of about 4.000 mm, a refractive index of about 1.56732, and an Abbe value of about 42.81;

a diaphragm exists between the object side of the fifth lens and the image side of the sixth lens, the diaphragm has a distance of about 5.336 mm;

the image side of the sixth lens has a refractive radius of about 136.010 mm, and a vertex distance of about 17.679 mm, the sixth space has a refractive index of about 1.0000;

the object side of the sixth lens has a refractive radius of about −29.021 mm, a vertex distance between the object side of the sixth lens and the image side of the sixth lens of about 10.000 mm, a refractive index of about 1.72915, and an Abbe value of about 54.66;

the image side of the seventh lens has a refractive radius of about −32.146 mm, a vertex distance between the image side of the seventh lens and the object side of the sixth lens of about 0.093 mm, the seventh space has a refractive index of about 1.0000;

the object side of the seventh lens has a refractive radius of about 51.817 mm, a vertex distance between the object side of the seventh lens and the image side of the seventh lens of about 4.000 mm, a refractive index of about 1.66680, and an Abbe value of about 33.04;

the image side of the eighth lens has a refractive radius of about 71.486 mm, a vertex distance between the image side of (he eighth lens and the object side of the seventh lens of about 0.814 mm, the eighth space has a refractive index of about 1.0000;

the object side of the eighth lens has a refractive radius of about −45.788 mm, a vertex distance between the object side of the eighth lens and the image side of the eighth lens of about 11.000 mm, a refractive index of about 1.60311, and an Abbe value of about 60.62;

the image side of the ninth lens has a refractive radius of about 64.776 mm, a vertex distance between the image side of the ninth lens and the object side of the eighth lens of about 1,837 mm, and a refractive index of about 1.0000;

the object side of the ninth lens has a refractive radius of about 358.885 mm, a vertex distance between the object side of the ninth lens and the image side of the ninth lens of about 9.000 mm, a refractive index of about 1.60311, and an Abbe value of about 60.62; and the projection objective lens assembly has a focal distance of about 40 mm, a back focal length of 35 mm, a relative aperture of 1:1.9, an image angle of 2w=39°, and a curved object field.

6. The projection objective assembly of claim 3, wherein:

the image side of the first lens has a refractive radius of about 135.549 mm, the first space has a refractive index of about 1.0000;

the object side of the first lens has a refractive radius of about 40.596 mm, a vertex distance between the object side of the first lens and the image side of the first lens of about 7.000 mm, a refractive index of about 1.51633, and an Abbe value of about 64.12;

the image side of the second lens has a refractive radius of about 222.537 mm, a vertex distance between the image side of the second lens and the object side of the first lens of about 6.956 mm, the second space has a refractive index of about 1.0000;

the object side of the second lens has a refractive radius of about 53.985 mm, a vertex distance between the object side of the second lens and the image side of the second lens of about 6.500 mm, a refractive index of about 1.51633, and an Abbe value of about 64.12;

the image side of the third lens has a refractive radius of about 78.774 mm, a vertex distance between the image side of the third lens and the object side of the second lens of about 20.642 mm, the third space has a refractive index of about 1.0000;

the object side of the third lens has a refractive radius of about −79.537 mm, a vertex distance between the object side of the third lens and the image side of the third lens of about 13.000 mm, a refractive index of about 1.65159, and an Abbe value of about 58.53;

the image side of the fourth lens has a refractive radius of about 30.776 mm, a vertex distance between the image side of the fourth lens and the object side of the third lens of about 11.353 mm, the fourth space has a refractive index of about 1.0000;

the object side of the fourth lens has a refractive radius of about 87.075 mm, a vertex distance between the object side of the fourth lens and the image side of the fourth lens of about 9.500 mm, a refractive index of about 1.72915, and an Abbe value of about 54.66;

the image side of the fifth lens has an infinite refractive radius, a vertex distance between the image side of the fifth lens and the object side of the fourth lens of about 1.296 mm, the fifth space has a refractive index of about 1.0000;

the object side of the fifth lens has a refractive radius of about 18.416 mm, a vertex distance between the object side of the fifth lens and the image side of the fifth lens of about 4.000 mm, a refractive index of about 1.56732; and an Abbe value of about 42.81;

a diaphragm exists between the object side of the fifth lens and the image side of the sixth lens, the diaphragm has a vertex distance of about 5.334 mm;

the image side of the sixth lens has a refractive radius of about 147.728 mm, and a vertex distance of about 17.769 mm, the sixth space has a refractive index of about 1.0000;

the object side of the sixth lens has a refractive radius of about −28.893 mm, a vertex distance between the object side of the sixth lens and the image side of the sixth lens of about 10.000 mm, a refractive index of about 1.72915, and an Abbe value of about 54.66;

the image side of the seventh lens has a refractive radius of about −32.267 mm, a vertex distance between the image side of the seventh lens and the object side of the sixth lens of about 0.114 mm, the seventh space has a refractive index of about 1.0000;

the object side of the seventh lens has a refractive radius of about 53.439 mm, a vertex distance between the object side of the seventh lens and the image side of the seventh lens of about 4.000 mm, a refractive index of about 1.68893, and an Abbe value of about 31.06;

the image side of the eighth lens has a refractive radius of about 81.611 mm, a vertex distance between the image side of the eighth lens and the object side of the seventh lens of about 1.898 mm, the eighth space has a refractive index of about 1,0000;

the object side of the eighth lens has a refractive radius of about −51.483 mm, a vertex distance between the object side of the eighth lens and the image side of the eighth lens of about 11.000 mm, a refractive index of about 1.72915, and an Abbe value of about 54.66;

the image side of the ninth lens has a refractive, radius of about 67.997 mm, a vertex distance between the image side of the ninth lens and the object side of the eight lens of about 0.580 mm and a refractive index of about 1.0000;

the object side of the ninth lens has a refractive radius of about 156.001 mm, a vertex distance between the object side of the ninth lens and the image side of the ninth lens of about 9.000 mm a refractive index of about 1.72915, and an Abbe value of about 54.66; and projection objective lens assembly has a focal distance of about 40 mm, a back focal length of 34.9 mm, a relative aperture of 1:1.9, an image angle of 2w=39°, and a flat object field.

* * * * *

UNITED STATES PATENT AND TRADEMARK OFFICE
CERTIFICATE OF CORRECTION

PATENT NO. : 6,801,373 B2
DATED : October 5, 2004
INVENTOR(S) : Wolfgang Reinecke et al.

It is certified that error appears in the above-identified patent and that said Letters Patent is hereby corrected as shown below:

Title page,
Item [57], ABSTRACT,
Line 3, "$\alpha$ RBa" should be -- $\sigma$ RBa --.
Line 4, "$\alpha$ RBi" should be -- $\sigma$ RBi --.

Column 2,
Lines 36, 37, 41, 42 and 51, "$\alpha$ RBa" should be -- $\sigma$ RBa --.
Lines 37, 46, 47 and 52, "$\alpha$ RBi" should be -- $\sigma$ RBi --.
Line 59, "fist" should be -- first --.

Column 3,
Lines 42 and 43, "$\alpha$ RBa" should be -- $\sigma$ RBa --.

Column 5,
Line 19, "FIGS. 3.1 and 3.1b" should be -- FIGS. 3.1a and 3.1b --.
Line 44, "$\alpha$ RBa and $\alpha$ RBi" should be -- $\sigma$ RBa and $\sigma$ RBi --.
Lines 44 and 45 "$\alpha$ RBa =5.0°" should be -- $\sigma$ RBa =5.0° --.
Line 45, "$\alpha$ RBi =17.5°" should be -- $\sigma$ RBi =17.5° --.
Lines 51 and 52, "$\alpha$ RBa" should be -- $\sigma$ RBa --.
Line 55, "k(d)" should be -- $\lambda$(d) --.

Column 6,
Lines 12 and 17, "17.4" should be -- 17.4° --.
Line 23, "2.1" should be -- 2.1a --.
Line 30, "$\alpha$ RBa and $\alpha$ RBi" should be -- $\sigma$ RBa and $\sigma$ RBi --.
Line 30, "$\alpha$ RBa =4.2°" should be -- $\sigma$ RBa =4.2° --.
Line 31, "$\alpha$ RBi =17.7°" should be -- $\sigma$ RBi =17.7° --.
Line 36, "is" should be -- this --.
Line 39, "19.5" should be -- 19.5° --.
Line 52, "$\alpha$ RBa and $\alpha$ RBi" should be -- $\sigma$ RBa and $\sigma$ RBi --.
Lines 52 and 53, "$\alpha$ RBa =4.2°" should be -- $\sigma$ RBa =4.2° --.
Line 53, "$\alpha$ RBi =17.7°" should be -- $\sigma$ RBi =17.7° --.
Line 59, before "field" insert -- image --.

Column 7,
Line 15, delete "lens" (second occurrence).
Line 22, "a eighth" should be -- an eighth --.
Line 54, "six" should be -- sixth --.
Line 55, "a eighth" should be -- an eighth --.

UNITED STATES PATENT AND TRADEMARK OFFICE
CERTIFICATE OF CORRECTION

PATENT NO. : 6,801,373 B2
DATED : October 5, 2004
INVENTOR(S) : Wolfgang Reinecke et al.

It is certified that error appears in the above-identified patent and that said Letters Patent is hereby corrected as shown below:

Column 9,
Line 22, "nun" should be -- mm --.
Line 53, after "45" insert -- . -- (period).

Column 10,
Line 49, before the second occurrence of "fifth" delete "," (comma).

Column 11,
Line 14, "1.6031 1" should be -- 1.60311 --.
Line 25, delete "is".

Column 12,
Line 7, "42.8 1" should be -- 42.81 --.
Line 15, "nun" should be -- mm --.
Line 37, "1 1.000" should be -- 11.000 --.

Column 13,
Line 64, "eight" should be -- eighth --.

Column 14,
Line 10, before "following" insert -- the --.
Lines 14 and 22, "$\alpha$ RBa" should be -- $\sigma$ RBa --.
Lines 15 and 27, "$\alpha$ RBi" should be -- $\sigma$ RBi --.
Line 32, delete "that".
Line 32, "$\alpha$ RBa and $\alpha$ RBi" should be -- $\sigma$ RBa and $\sigma$ RBi --.
Line 32, "am" should be -- are --.

Column 15,
Line 10, "a" should be -- an --.
Line 51, "six" should be -- sixth --.
Line 55, "a" should be -- an --.
Line 57, delete "and".

Column 16,
Line 1, "six" should be -- sixth --.
Line 2, "a" should be -- an --.
Line 42, "abject" should be -- object --.

UNITED STATES PATENT AND TRADEMARK OFFICE
CERTIFICATE OF CORRECTION

PATENT NO. : 6,801,373 B2
DATED : October 5, 2004
INVENTOR(S) : Wolfgang Reinecke et al.

It is certified that error appears in the above-identified patent and that said Letters Patent is hereby corrected as shown below:

Column 18,
Line 1, "0.76" should be -- -0.76 --.

Column 19,
Line 54, delete "is".
Line 55, "34.81" should be -- 34.8° --.
Line 58, "fist" should be -- first --.

Column 21,
Line 9, "1,837" should be -- 1.837 -- (decimal point).

Column 22,
Line 39, "1,0000" should be -- 1.0000 -- (decimal point).
Line 47, "eight" should be -- eighth --.
Line 55, before "projection" insert -- the --.

Signed and Sealed this

Third Day of May, 2005

JON W. DUDAS
*Director of the United States Patent and Trademark Office*